US008883286B2

(12) United States Patent
Saito et al.

(10) Patent No.: US 8,883,286 B2
(45) Date of Patent: Nov. 11, 2014

(54) HONEYCOMB STRUCTURE

(75) Inventors: Sho Saito, Ibi-gun (JP); Kazuya Naruse, Ibi-gun (JP); Toshiaki Shibata, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 810 days.

(21) Appl. No.: 13/009,166

(22) Filed: Jan. 19, 2011

(65) Prior Publication Data
US 2011/0237427 A1    Sep. 29, 2011

(30) Foreign Application Priority Data

Mar. 23, 2010   (WO) .................. PCT/JP2010/054956

(51) Int. Cl.
 *F01N 3/022*   (2006.01)
 *B01J 32/00*   (2006.01)
 *B01D 46/24*   (2006.01)

(52) U.S. Cl.
 CPC ......... *B01D 46/2474* (2013.01); *F01N 2330/30* (2013.01); *B01D 46/2455* (2013.01); *B01D 46/2466* (2013.01); *B01D 2046/2485* (2013.01); *B01D 46/247* (2013.01); *B01D 2046/2481* (2013.01); *F01N 3/0222* (2013.01); *B01D 46/2459* (2013.01); *B01D 2046/2492* (2013.01); *Y02T 10/20* (2013.01); *B01D 2279/30* (2013.01)
 USPC .............. 428/116; 55/523; 422/180; 502/439

(58) Field of Classification Search
 USPC ............................ 428/116–118; 55/522–524; 422/169–172, 177–180
 See application file for complete search history.

(56) References Cited

U.S. PATENT DOCUMENTS

| 5,514,446 | A | 5/1996 | Machida et al. |
| 2006/0269722 | A1 * | 11/2006 | Yamada ......................... 428/116 |
| 2007/0128405 | A1 | 6/2007 | Sakaguchi et al. |
| 2008/0236394 | A1 | 10/2008 | Ohno et al. |
| 2008/0241009 | A1 | 10/2008 | Ohno et al. |
| 2009/0239028 | A1 * | 9/2009 | Ohno et al. .................... 428/116 |

FOREIGN PATENT DOCUMENTS

| CA | 1145270 | 4/1983 |
| EP | 1676622 | 7/2006 |
| EP | 1736221 | 12/2006 |
| EP | 1736459 | 12/2006 |

(Continued)

OTHER PUBLICATIONS

International Search Report for corresponding International Application No. PCT/JP2010/054956, Jun. 29, 2010.

(Continued)

*Primary Examiner* — David Sample
*Assistant Examiner* — Nicholas W Jordan
(74) *Attorney, Agent, or Firm* — Mori & Ward, LLP

(57) ABSTRACT

A honeycomb structure includes a ceramic block including at least one honeycomb fired body. The at least one honeycomb fired body has cell walls and a peripheral wall. The peripheral wall is formed around the at least one honeycomb fired body. The peripheral wall of the at least one honeycomb fired body, which forms a periphery of the ceramic block, is a stepped peripheral wall provided with a level difference. The level difference includes a projected portion and a recessed portion in a cross section perpendicular to a longitudinal direction of the at least one honeycomb fired body. At least one of the projected portion and the recessed portion is formed by at least one of a curve line and a straight line in the cross section perpendicular to the longitudinal direction of the at least one honeycomb fired body by being subjected to chamfering.

36 Claims, 15 Drawing Sheets

(56) References Cited

FOREIGN PATENT DOCUMENTS

| EP | 1787969 | 5/2007 |
|---|---|---|
| EP | 1977808 | 10/2008 |
| EP | 1977810 | 10/2008 |
| EP | 2070579 | 6/2009 |
| EP | 2105181 | 9/2009 |
| EP | 2105183 | 9/2009 |
| EP | 2145661 | 1/2010 |
| JP | 62-096717 | 5/1987 |
| JP | 2604876 B2 | 12/1991 |
| JP | 7-246341 | 9/1995 |
| JP | 2004-154718 | 6/2004 |
| JP | 2005-007218 | 1/2005 |
| JP | 2005-144250 | 6/2005 |
| JP | 2008-168279 | 7/2008 |
| JP | 2008-238158 | 10/2008 |
| JP | 2008-272731 | 11/2008 |
| JP | 2009-148742 | 7/2009 |
| JP | 2009-255037 | 11/2009 |
| JP | 2009-255046 | 11/2009 |
| WO | WO 2006/137150 | 12/2006 |
| WO | WO 2007/058007 | 5/2007 |
| WO | WO 2008/126334 | 10/2008 |
| WO | WO 2008/126335 | 10/2008 |
| WO | WO 2008/126692 | 10/2008 |

OTHER PUBLICATIONS

Extended European Search Report for corresponding EP Application No. 10191873.8-1213, May 18, 2011.
International Search Report for corresponding International Application No. PCT/JP2010/054959, Jun. 29, 2010.
Extended European Search Report for corresponding EP Application No. 10190134.6-1213, May 19, 2011.
Extended European Search Report for corresponding EP Application No. 11152224.9-1213, Jun. 8, 2011.
International Search Report for International Application No. PCT/JP2010/054955, Jun. 22, 2010.
Office Action with Notice of References Cited issued by the U.S. Patent and Trademark Office for the U.S. Appl. No. 13/009,157, Apr. 10, 2014.
Office Action with Notice of References Cited issued by the U.S. Patent and Trademark Office for the U.S. Appl. No. 13/009,157, Oct. 17, 2013.
Office Action with Notice of References Cited issued by the U.S. Patent and Trademark Office for the U.S. Appl. No. 13/053,219, Feb. 27, 2014.

* cited by examiner

BACKGROUND ART

BACKGROUND ART

B-B line cross-sectional view

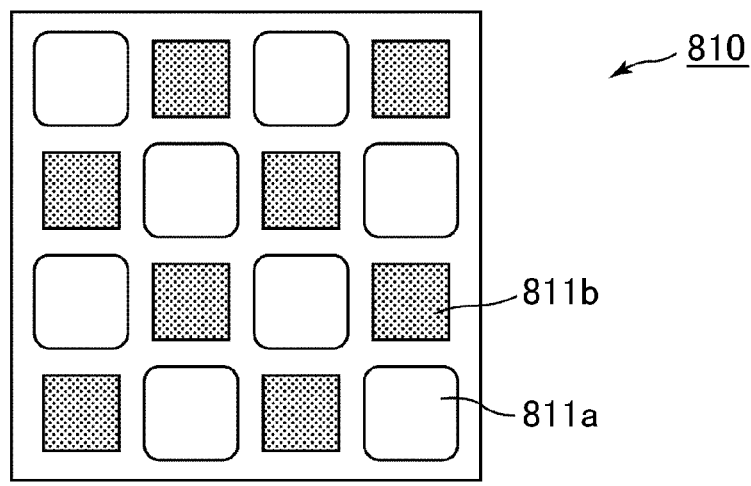
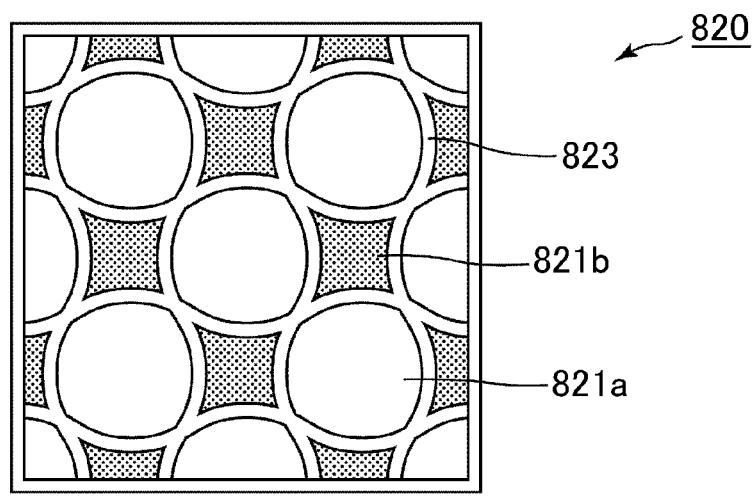

US 8,883,286 B2

HONEYCOMB STRUCTURE

CROSS-REFERENCE TO RELATED APPLICATIONS

The present application claims priority under 35 U.S.C. §119 to International Application No. PCT/JP2010/054956 filed on Mar. 23, 2010, the contents of which are incorporated herein by reference in their entirety.

BACKGROUND OF THE INVENTION

1. Field of the Invention

The present invention relates to a honeycomb structure.

2. Discussion of the Background

In recent years, particulates (hereinafter, also referred to as "PM") such as soot and other toxic components contained in exhaust gases discharged from internal combustion engines of vehicles such as buses and trucks, construction machines and the like has raised serious problems as contaminants harmful to the environment and the human body. For this reason, various honeycomb structures made of porous ceramics have been proposed as honeycomb filters for collecting PM in exhaust gases to purify the exhaust gases.

Conventionally-known honeycomb structures as above described include a honeycomb structure having a ceramic block including a combination of a plurality of honeycomb fired bodies each having a large number of cells (JP-A 2004-154718). FIGS. 1A and 1B set forth herein schematically illustrate examples of the honeycomb fired bodies positioned at the outermost periphery of the honeycomb structure, among honeycomb fired bodies used to manufacture a conventional honeycomb structure disclosed in JP-A 2004-154718. Honeycomb fired bodies 1110 and 1120 illustrated in FIGS. 1A and 1B respectively have cells 1111 and 1121 positioned closest to the curved surface forming the peripheral face of the honeycomb block. The shapes of the cells 1111 and 1121 in a cross section perpendicular to the longitudinal direction of the cells (hereinafter, simply referred to as cross-sectional shape) respectively have an approximate triangular shape and an approximate trapezoidal shape, which are different from the cross-sectional shapes of cells positioned under the cells 1111 and 1121. Each of the cells 1111 and 1121 has a side formed along the curved surface.

A honeycomb structure as disclosed in WO 2008/126335 A1 has been proposed as a honeycomb structure in which cells of a honeycomb fired body are more likely to be surely sealed without defective filling. WO 2008/126335 A1 discloses a honeycomb structure which facilitates filling of cells with a plug material paste by the following configuration. Namely, in a honeycomb fired body included in the honeycomb structure, the cross-sectional shape of a cell contacting with a peripheral wall forming the periphery of a ceramic block (hereinafter, also referred to as a cell positioned at the outermost periphery), among peripheral walls of the honeycomb fired body, and the cross sectional shape of a cell not positioned at the outermost periphery are the same.

FIGS. 2A and 2B set forth herein show examples of honeycomb fired bodies included in the conventional honeycomb structure disclosed in WO 2008/126335 A1, in which the cross-sectional shape of a cell positioned at the outermost periphery and the cross sectional shape of a cell not positioned at the outermost periphery are the same. Cells 1151 in a honeycomb fired body 1150 and cells 1161 in a honeycomb fired body 1160 all have the square cross-sectional shape. Further, the cells 1151 and 1161 are formed so as to be positioned at equal intervals in the honeycomb fired bodies 1150 and 1160, respectively. In order to make the cell positioned at the outermost periphery and the cell not positioned at the outermost periphery have the same cross-sectional shape, a peripheral wall 1154 in the honeycomb fired body 1150 and a peripheral wall 1164 of the honeycomb fired body 1160 respectively have level differences at positions corresponding to the cells 1151 and 1161 positioned at the outermost periphery.

The contents of JP-A 2004-154718 and WO 2008/126335 A1 are incorporated herein by reference in their entirety.

SUMMARY OF THE INVENTION

According to one aspect of the present invention, a honeycomb structure includes a ceramic block including at least one honeycomb fired body. The at least one honeycomb fired body has cell walls and a peripheral wall. The cell walls extend along a longitudinal direction of the at least one honeycomb fired body to define cells. The peripheral wall is formed around the at least one honeycomb fired body. The peripheral wall of the at least one honeycomb fired body, which forms a periphery of the ceramic block, is a stepped peripheral wall provided with a level difference. The level difference includes a projected portion and a recessed portion in a cross section perpendicular to the longitudinal direction of the at least one honeycomb fired body. At least one of the projected portion and the recessed portion is formed by at least one of a curve line and a straight line in the cross section perpendicular to the longitudinal direction of the at least one honeycomb fired body by being subjected to chamfering.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 17A and 17B are side views each schematically illustrating one example of an end face of the inner honeycomb fired body in the honeycomb structure of the embodiment of the present invention.

DESCRIPTION OF THE EMBODIMENTS

Figure 1A:
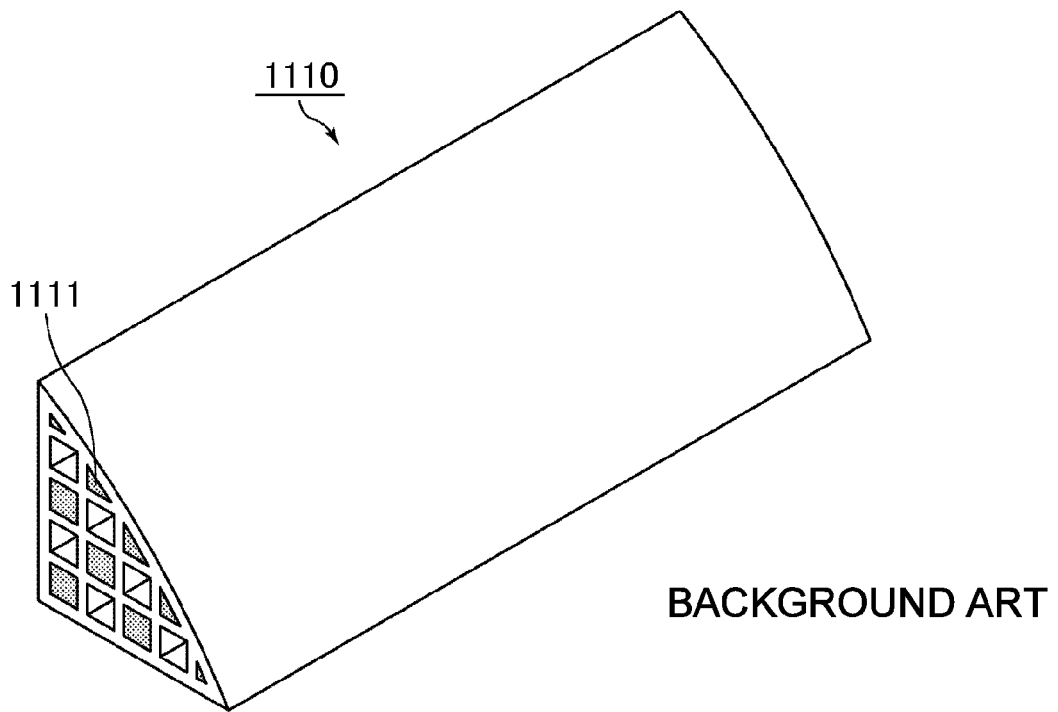
FIG. 1A is a perspective view schematically illustrating one example of the honeycomb fired body positioned at the outermost periphery of the honeycomb structure, among the honeycomb fired bodies used for manufacturing a conventional honeycomb structure.

The embodiments will now be described with reference to the accompanying drawings, wherein like reference numerals designate corresponding or identical elements throughout the various drawings.

Figure 1B:
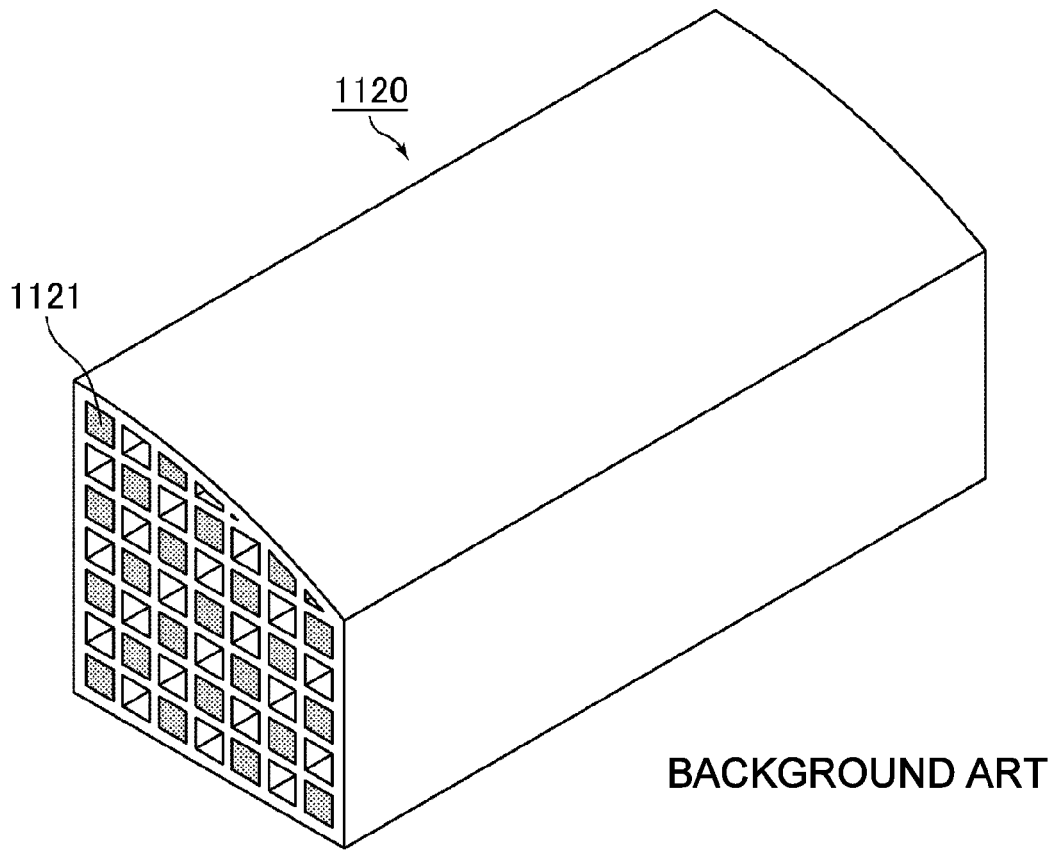
FIG. 1B is a perspective view schematically illustrating another example of the honeycomb fired body positioned at the outermost periphery of the conventional honeycomb structure.

In the conventional honeycomb structure disclosed in JP-A 2004-154718, cells 1111 of a honeycomb fired body 1110 illustrated in FIG. 1A set forth herein and cells 1121 of a honeycomb fired body 1120 illustrated in FIG. 1B set forth herein have small opening areas, and therefore, a plug material paste may not easily fill the cells or may easily leak or protrude from the cells. As a result, the cells may not be sufficiently sealed, so that defective sealing tends to occur.

Use of a honeycomb structure including the honeycomb fired body with insufficiently-sealed cells as an exhaust-gas purifying filter causes a problem that the honeycomb structure allows exhaust gases flowing therein to flow out from the same cell without passing through a cell wall, resulting in a failure to fulfill the function as a filter.

Figure 2A:
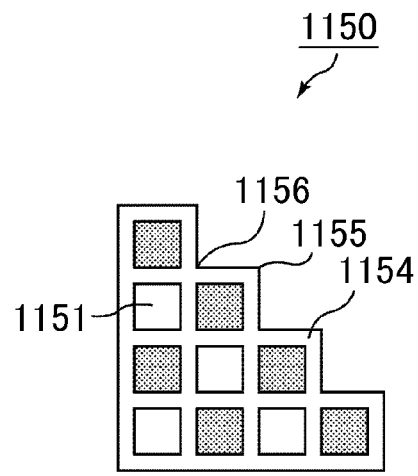
FIG. 2A is a side view schematically illustrating one example of the honeycomb fired body in the conventional honeycomb structure in which a cell positioned at the outermost periphery and a cell positioned not at the outermost periphery have the same cross-sectional shape.
Figure 2B:
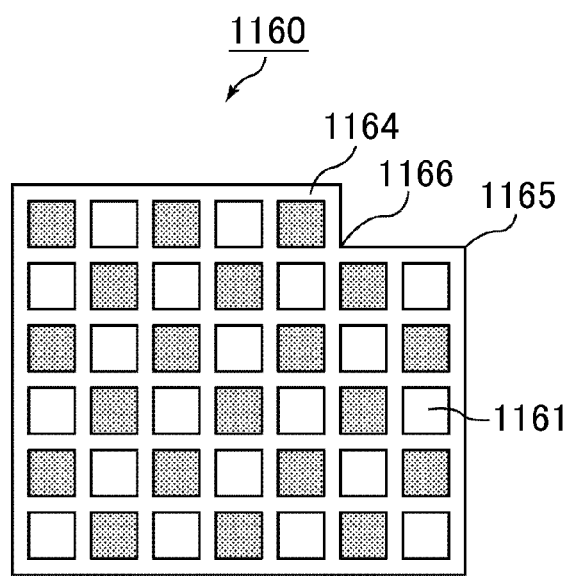
FIG. 2B is a side view schematically illustrating another example of the honeycomb fired body in the conventional honeycomb structure in which a cell positioned at the outermost periphery and a cell positioned not at the outermost periphery have the same cross-sectional shape.

In the honeycomb fired body included in the conventional honeycomb structure disclosed in WO 2008/126335 A1, peripheral walls of the honeycomb fired body are provided with level differences. Namely, the peripheral wall of the honeycomb fired body included in the conventional honeycomb fired body disclosed in WO 2008/126335 A1 are provided with level differences formed by projected portions 1155 and recessed portions 1156 as illustrated in FIG. 2A set forth herein, or a level difference formed by a projected portion 1165 and a recessed portion 1166 as illustrated in FIG. 2B set forth herein.

In such honeycomb fired bodies included in the conventional honeycomb structure, a defective sealing are less likely to occur and cells are more likely to be sufficiently sealed. However, in the case that a wet mixture is extrusion molded to manufacture a honeycomb molded body, there is a problem that formation of the peripheral wall is difficult because the peripheral wall of the honeycomb fired body is provided with projected portions and recessed portions in a cross section perpendicular to the longitudinal direction of the honeycomb fired body. The reason for this is presumably as follows. The wet mixture is not easily introduced to the projected portions or the recessed portions of a die to be used in extrusion-molding, and therefore, the amount of the wet mixture introduced to the projected portions or the recessed portions of the die tends to be insufficient. As a result, a peripheral wall in the desired shape is less likely to be manufactured and defective molding such as a chipped projected portion and a partially-thin recessed portion of the peripheral wall tends to occur.

There are still other problems that a projected portion on the peripheral wall of the honeycomb molded body is chipped due to a contact of the peripheral wall with a transfer jig and the like in a drying treatment and the like after the extrusion molding, and that an insufficient amount of the wet mixture introduced to the recessed portion of the peripheral wall make a crack starts from the recessed portion due to expansion and contraction caused by the temperature change in the drying treatment, a firing treatment, or the like. These problems tend to increase the manufacture of defective honeycomb fired bodies, and therefore, the manufacturing efficiency of the honeycomb structure tends to be reduced.

In addition, in the case that a honeycomb structure is manufactured with use of such honeycomb fired bodies, the projected portions and the recessed portions are still present on the peripheral walls of the honeycomb fired bodies, peripheral walls of a honeycomb block formed by the honeycomb fired bodies, and peripheral walls of the manufactured honeycomb structure. Therefore, during the manufacture of the honeycomb structure or when the honeycomb structure is used as a honeycomb filter, defects tend to occur, such as a chipped projected portion of the peripheral wall of the honeycomb structure and cracks starting from the projected and/or recessed portions of the peripheral wall due to expansion and contraction of the honeycomb fired body subjected to high temperatures during regeneration treatment and the like.

In the honeycomb structure according to an embodiment of the present invention, cells of the honeycomb fired body included in the honeycomb structure are easily filled with a plug material paste for sealing the cells, and it becomes easier to prevent a chip, a crack, and the like in the peripheral walls of the honeycomb fired body or of the honeycomb structure.

The honeycomb structure according to the embodiment of the present invention includes a ceramic block including a honeycomb fired body that has a large number of cells longitudinally placed in parallel with one another with a cell wall therebetween and has a peripheral wall formed around the honeycomb fired body. A peripheral wall of the honeycomb fired body is a stepped peripheral wall provided with a level difference including a projected portion and a recessed portion in a cross section perpendicular to a longitudinal direction of the honeycomb fired body in the case of the peripheral wall forming a periphery of the ceramic block, and at least one of the projected portion and the recessed portion is formed by at least one of a curve line and a straight line in a cross section perpendicular to the longitudinal direction of the honeycomb fired body by being subjected to chamfered.

In the honeycomb structure according to the embodiment of the present invention, the peripheral wall of the honeycomb fired body is provided with a level difference formed by a projected portion and a recessed portion in a cross section perpendicular to the longitudinal direction of the honeycomb fired body in the case of the peripheral wall forming the periphery of the ceramic block.

In the conventional honeycomb structure, a cell having a cell cross-sectional shape different from that of an inner cell of the above cell and having a smaller cell cross-sectional area (hereinafter, also referred to as an incomplete cell) remains in the manufacture of the honeycomb structure. Therefore, defective sealing of the cells tends to occur to lower the sealing efficiency of the cells. However, in the honeycomb structure according to the embodiment of the present invention, a level difference formed by the projected portion and the recessed portion provided on the peripheral wall of the honeycomb fired body is more likely to reduce the number of incomplete cells positioned at the outermost periphery of the honeycomb structure. This is more likely to increase the cross-sectional area of the cells positioned at the outermost periphery of the honeycomb structure, and therefore, the filtering area is increased. This is more likely to improve the capturing efficiency of PM and the pressure loss. Further, filling of the cells with a plug material paste is more likely to be also facilitated so that the defective sealing is more likely to be reduced. As a result, the manufacturing efficiency of the honeycomb structure is more likely to be improved.

In the present description, a cell wall of the honeycomb fired body refers to a portion that is present between two cells to separate the two cells. Further, in the present description, a peripheral wall of the honeycomb fired body refers to a portion that is present around the honeycomb fired body and forms the periphery of the honeycomb fired body.

In the honeycomb structure according to the embodiment of the present invention, at least one of the projected portion and the recessed portion is subjected to chamfering so as to be formed by at least one of a curve line and a straight line in a cross section perpendicular to the longitudinal direction of the honeycomb fired body.

Namely, in the honeycomb structure according to the embodiment of the present invention, the chamfered part of at least one of the projected portions and the recessed portions is formed by at least one of curve lines and straight lines in a cross section perpendicular to the longitudinal direction of the honeycomb fired body.

Therefore, it becomes easier to prevent the case that the insufficient amount of the wet mixture introduced to the projected or recessed portion of the die causes a chipped projected portion of the peripheral wall or a partially-thin recessed portion of the peripheral wall. In addition, it also becomes easier to prevent other defects, such as a projected portion on the peripheral wall of the honeycomb molded body being chipped due to a contact of the peripheral wall with a transfer jig and the like during a drying process, a firing process, a binding process, and the like after the extrusion molding for manufacturing a honeycomb fired body included in the honeycomb structure, and a crack starting from the recessed portion of the peripheral wall due to expansion and contraction caused by the temperature change in the drying treatment, the firing treatment, or the like because of the insufficient amount of the wet mixture introduced in the recessed portion of the peripheral wall. As a result, defects of the honeycomb molded body and the honeycomb fired body are more likely to be reduced so that the manufacturing efficiency of the honeycomb structure are more likely to be improved.

In addition, during the manufacture of the honeycomb structure according to the embodiment of the present invention or in use of the honeycomb structure according to the embodiment of the present invention as a honeycomb filter, it becomes easier to prevent defects such as a chipped projected portion of the peripheral wall of the honeycomb structure or cracks starting from at least one of the projected portion and the recessed portion due to expansion and contraction of the honeycomb fired body subjected to high temperatures.

In the honeycomb structure according to the embodiment of the present invention, the ceramic block desirably includes a plurality of the honeycomb fired bodies bound to one another with an adhesive layer interposed therebetween.

Further, in the honeycomb structure according to the embodiment of the present invention, the ceramic block desirably includes a combination of the honeycomb fired bodies having various shapes, and the honeycomb fired bodies desirably include an outer honeycomb fired body positioned at a peripheral portion of the ceramic block and an inner honeycomb fired body positioned under the outer honeycomb fired body.

In the honeycomb structure according to the embodiment of the present invention, at least one of the projected portion and the recessed portion is desirably formed only by a curve line in a cross section perpendicular to the longitudinal direction of the honeycomb fired body.

Namely, in the honeycomb structure according to the embodiment of the present invention, the chamfered portion of at least one of the projected portions and the recessed portions of the peripheral wall is desirably formed only by curve lines in a cross section perpendicular to the longitudinal direction of the honeycomb fired body. In the case that at least one of the projected portion and the recessed portion of the peripheral wall has an entirely-curve profile in a cross section perpendicular to the longitudinal direction of the honeycomb fired body, the honeycomb fired body is more likely to be excellent in stress relaxation. Accordingly, it becomes easier to further prevent defects such as a chipped projected portion of the peripheral wall caused by a contact with a jig and the like when the honeycomb fired body is transferred or cracks starting from at least one of the projected portion and the recessed portion due to expansion and contraction of the honeycomb fired body subjected to high temperatures.

In the honeycomb structure according to the embodiment of the present invention, the cells desirably include peripheral cells contacting with the peripheral wall of the honeycomb fired body and inner cells positioned under the peripheral cells, inner walls of the peripheral cells desirably have corner portions, and at least one of the corner portions is desirably subjected to chamfering.

In the honeycomb structure according to the embodiment of the present invention, at least one of the corner portions formed on the inner wall of the peripheral cell (hereinafter, simply referred to as "corner portions of the peripheral cell") is desirably subjected to chamfering. The chamfered corner portion of the peripheral cell is more likely to release the stress compared to the case where the corner portion of the peripheral cell is sharp. Accordingly, it becomes easier to further prevent defects such as a chipped projected portion of the peripheral wall caused by a contact with a jig and the like when the honeycomb fired body is transferred or cracks starting from at least one of the projected portion and the recessed portion due to expansion and contraction of the honeycomb fired body subjected to high temperatures.

In the honeycomb structure according to the embodiment of the present invention, the corner portions subjected to chamfering desirably include a corner portion formed by the stepped peripheral wall and a corner portion formed by the stepped peripheral wall and the cell wall.

When chamfering is carried out to the corner portion formed by the stepped peripheral walls and to the corner portion formed by the stepped peripheral wall and the cell wall among the corner portions of the peripheral cell, it becomes easier to release the stress applied to the projected portion or the recessed portion on the stepped peripheral wall of the honeycomb fired body. Accordingly, it becomes easier to further prevent a chipped projected portion of the peripheral wall, cracks starting from at least one of the projected portion and the recessed portion of the peripheral wall, and the like.

In addition, it becomes easier to make the thickness of the stepped peripheral wall of the honeycomb fired body uniform including the thickness of a part corresponding to the position of the projected portion. Therefore, it becomes easier to prevent deformation of the peripheral wall of the honeycomb molded body in extrusion molding.

In the honeycomb structure according to the embodiment of the present invention, the chamfering carried out on the at least one of corner portions is desirably R chamfering, and the R chamfering is desirably carried out in a manner such that a radius of curvature is from about 0.3 mm to about 2.5 mm.

The R chamfering makes the corner portion of the peripheral cell have a curved profile in a cross section perpendicular to the longitudinal direction of the honeycomb fired body, and therefore, the honeycomb fired body is more likely to be excellent in stress relaxation. Accordingly, it becomes easier to further prevent a crack and the like starting from at least one of the projected portion and the recessed portion of the peripheral wall.

In the honeycomb structure according to the embodiment of the present invention, the cells desirably include peripheral cells contacting with the peripheral wall of the honeycomb fired body and inner cells positioned under the peripheral cells, the inner cells are desirably complete cells formed in accordance with a basic formation pattern, and peripheral cells contacting with the stepped peripheral wall, among the peripheral cells, desirably include an incomplete cell having a shape different from the complete cell in a cross section perpendicular to the longitudinal direction.

The honeycomb structure according to the embodiment of the present invention is desirably different from the conventional honeycomb structure disclosed in JP-A 2004-154718 in that the incomplete cell is included, whereas all of the cells positioned at the outermost periphery and the cells positioned not at the outermost periphery have the same cross-sectional shape in the honeycomb structure disclosed in JP-A2004-154718. In such a case, it becomes easier to reduce the number of the projected or recessed portions on the stepped peripheral wall of the honeycomb fired body in the cross section perpendicular to the longitudinal direction of the honeycomb fired body. As a result, it becomes easier to prevent defects such as a chipped projected portion of the peripheral wall or a partially-thin recessed portion of the peripheral wall due to the insufficient amount of the wet mixture introduced to the projected or recessed portion of the die in extrusion molding process. In addition, it becomes easier to further prevent defects such as a projected portion on the peripheral wall of the honeycomb molded body or the honeycomb fired body being chipped due to a contact with a jig and the like during the transfer in a drying process, a firing process, or the like after the extrusion molding, and a crack starting from at least one of the projected portion and the recessed portion of the peripheral wall due to expansion and contraction when the honeycomb molded body or the honeycomb fired body is subjected to high temperatures.

Moreover, when such a honeycomb structure is used as an exhaust gas-purifying filter, it becomes easier to increase the filtering area for capturing PM so that the pressure loss is more likely to be lowered.

In the honeycomb structure according to the embodiment of the present invention, the inner cells and the peripheral cells other than the incomplete cell desirably have approximate quadrangle shapes in cross sections perpendicular to the longitudinal direction.

In the honeycomb structure according to the embodiment of the present invention, the inner cells and the peripheral cells other than the incomplete cell desirably include large volume cells and small volume cells, and each of the large volume cells is desirably larger than each of the small volume cells in a cross section perpendicular to the longitudinal direction.

When such a honeycomb structure is used as an exhaust gas-purifying filter, it becomes easier to capture a large amount of PM.

In the honeycomb structure according to the embodiment of the present invention, each of the large volume cells desirably has an approximate quadrangle shape in a cross section perpendicular to the longitudinal direction, and each of the small volume cells has an approximate quadrangle shape in a cross section perpendicular to the longitudinal dereliction.

In the honeycomb structure according to the embodiment of the present invention, each of the large volume cells desirably has an approximate octagonal shape in a cross section perpendicular to the longitudinal direction, and each of the small volume cells desirably has an approximate quadrangle shape in a cross section perpendicular to the longitudinal direction.

In the honeycomb structure according to the embodiment of the present invention, each side of the large volume cells and of the small volume cells is desirably formed by a curve line in a cross section perpendicular to the longitudinal direction.

In the case of having cells with the above-described cross-sectional shapes, the honeycomb structure according to the embodiment of the present invention is more likely to capture PM in exhaust gases favorably when used as an exhaust gas-purifying filter.

In the honeycomb structure according to the embodiment of the present invention, the stepped peripheral wall of the honeycomb fired body is desirably thicker than the cell wall of the honeycomb fired body.

The shapes of the projected portion and the recessed portion, which form the level difference, are easily made into the shapes formed by at least one of a curve line and a straight line in a cross section perpendicular to the longitudinal direction of the honeycomb fired body, when the stepped peripheral wall is thicker than the cell wall.

In addition, it becomes easier to make the honeycomb structure have the peripheral walls having high mechanical strength.

In the honeycomb structure according to the embodiment of the present invention, the stepped peripheral wall of the honeycomb fired body is desirably from about 1.3 times to about 3.0 times thicker than the cell wall of the honeycomb fired body.

When the stepped peripheral wall is about 1.3 times or more thicker than the cell wall of the honeycomb fired body, the shapes of the projected portion and the recessed portion of the peripheral wall, which form the level difference, may be easily made into the shapes formed by at least one of a curve line and a straight line in a cross section perpendicular to the longitudinal direction of the honeycomb fired body. In addition, it is easier to secure the sufficient mechanical strength of the peripheral wall of the honeycomb structure.

In contrast, when the stepped peripheral wall is about 3.0 times or less thicker than the cell wall of the honeycomb fired body, the opening ratio of the honeycomb structure is less likely to be lowered.

In the honeycomb structure according to the embodiment of the present invention, the thickness of the peripheral walls other than parts corresponding to positions of the projected portion and the recessed portion, among the stepped peripheral walls of the honeycomb fired body, is desirably approximately uniform.

In the honeycomb structure according to the embodiment of the present invention, the cells are desirably alternately sealed at either end portions.

In the honeycomb structure according to the embodiment of the present invention, a coat layer is desirably formed on a peripheral face of the ceramic block.

First Embodiment

Hereinafter, a first embodiment that is one embodiment of the honeycomb structure of the present invention is described with reference to drawings.

In the following, both the outer honeycomb fired body and the inner honeycomb fired body are simply referred to as the honeycomb fired body in the case that it is not necessary to distinguish them from each other. In addition, the peripheral cell and the inner cell, and the complete cell and the incomplete cell may be simply referred to as the cell in the case that it is not necessary to distinguish them from each other.

In the present description, simple phrases of a cross section of the honeycomb structure, a cross section of the honeycomb fired body, and a cross section of the honeycomb molded body refer to a cross section perpendicular to the longitudinal direction of the honeycomb structure, a cross section perpendicular to the longitudinal direction of the honeycomb fired body, and a cross section perpendicular to the longitudinal direction of the honeycomb molded body.

Further, in the present description, a simple phrase of the cross sectional area of the honeycomb fired body refers to the area of the cross section perpendicular to the longitudinal direction of the honeycomb fired body.

Figure 3:
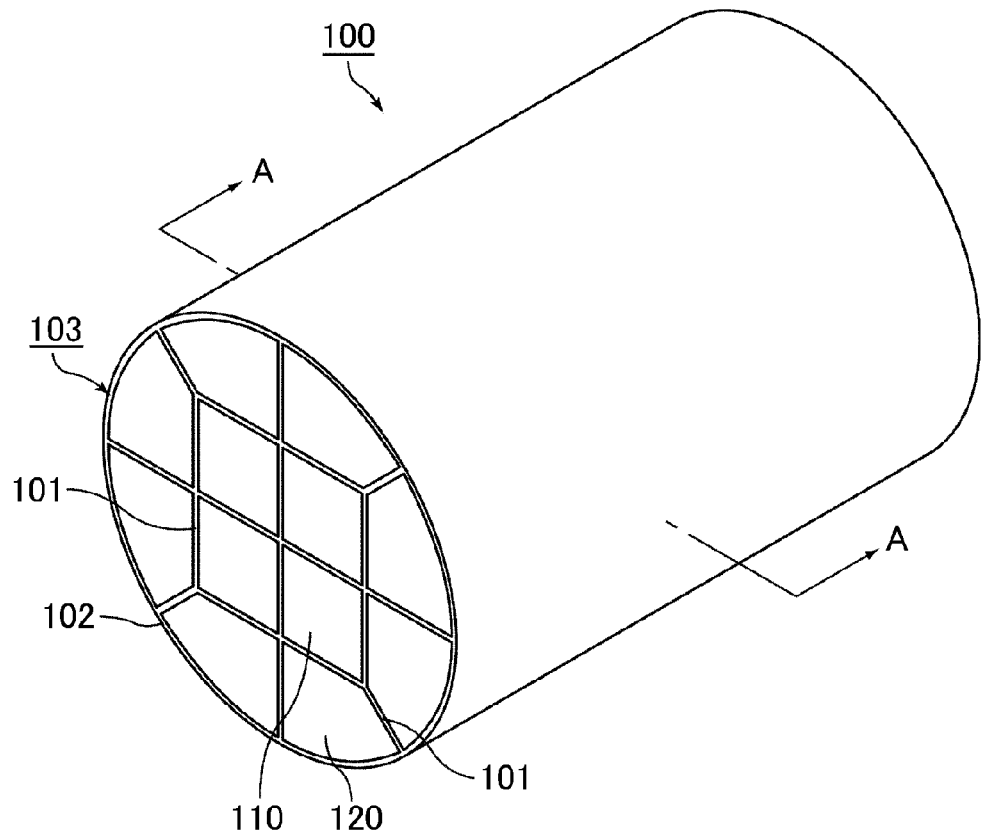
FIG. 3 is a perspective view schematically illustrating one example of a honeycomb structure of a first embodiment of the present invention.

FIG. 3 is a perspective view schematically illustrating one example of a honeycomb structure of a first embodiment of the present invention.

Figure 4:
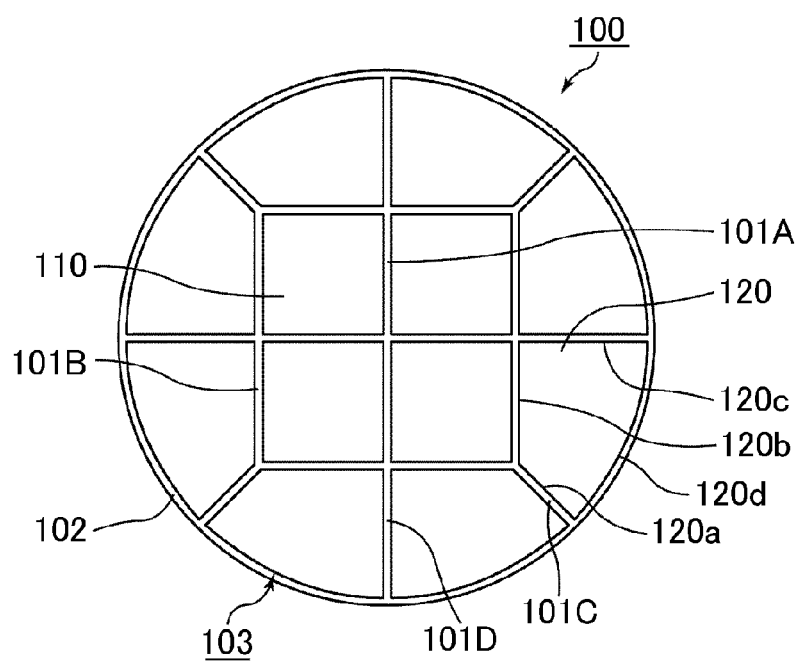
FIG. 4 is an A-A line cross sectional view of the honeycomb structure illustrated in FIG. 3.

FIG. 4 is an A-A line cross sectional view of the honeycomb structure illustrated in FIG. 3.

In a honeycomb structure 100 illustrated in FIGS. 3 and 4, a plurality of inner honeycomb fired bodies 110 and a plurality of honeycomb fired bodies 120 are bound with adhesive layers 101 (101A to 101D) interposed therebetween to form a ceramic block 103. Additionally, the ceramic block 103 has a coat layer 102 formed on its periphery. Here, the coat layer may be formed according to need.

The honeycomb fired bodies 110 and 120 in the honeycomb structure 100, which will be described later, are preferably porous bodies including silicon carbide or silicon-containing silicon carbide.

In the honeycomb structure 100, as illustrated in FIGS. 3 and 4, eight honeycomb fired bodies 120 are positioned to form the periphery of the ceramic block 103 and four honeycomb fired bodies 110 are positioned under the honeycomb fired bodies 120. A total of 12 honeycomb fired bodies are bound to one another with the adhesive layers 101 (101A to 101D) interposed therebetween in a manner such that the cross section of the ceramic block 103 (the honeycomb structure 100) becomes an approximate circular shape.

In the following, the honeycomb fired body positioned to form the periphery of the ceramic block is referred to as "an outer honeycomb fired body" and the honeycomb fired body positioned under the outer honeycomb fired body is referred to as "an inner honeycomb fired body".

In the honeycomb structure of the present embodiment, the ceramic block includes a combination of honeycomb fired bodies having different shapes, or the ceramic block includes the outer honeycomb fired bodies positioned at the peripheral portion of the ceramic block and the inner honeycomb fired bodies positioned under the outer honeycomb fired bodies.

The peripheral wall of the outer honeycomb fired body 120 is provided with level differences formed by projected portions and recessed portions in a cross section perpendicular to the longitudinal direction of the honeycomb fired body, as later described. Therefore, the peripheral face of the ceramic block 103 is provided with level differences. The coat layer 102 on the periphery of the ceramic block 103 is formed in a manner such that the recessed portions of the level differences are filled.

In the present description, the projected portion refers to a projection formed by one cell on the outside of the peripheral wall forming the periphery of the ceramic block among the peripheral walls of the honeycomb fired body. Further, in the present description, the recessed portion refers to a recess formed by two adjacent cells on the outside of the peripheral wall forming the periphery of the ceramic block among the peripheral walls of the honeycomb fired body.

As illustrated in FIG. 4, in the cross section of the honeycomb structure 100, an adhesive layer 101C is formed along the direction from the edge of one inner honeycomb fired body 110 towards the peripheral side face of the honeycomb structure 100 and an adhesive layer 101D is formed along the direction from the interspace between two inner honeycomb fired bodies 110 towards the peripheral side face of the honeycomb structure 100. The adhesive layer 101C and the adhesive layer 101D are formed at a predetermined angle (e.g. about 45°) to each other to bind the outer honeycomb fired bodies 120.

The cross-sectional shape of the inner honeycomb fired body 110 illustrated in FIG. 4 is approximately quadrangle (approximately square).

As illustrated in FIG. 4, the cross-sectional shape of the outer honeycomb fired body 120 is a shape surrounded by three line segments 120a, 120b, and 120c and one approximate arc 120d. Two angles formed by two line segments out of the three line segments (the angle formed by the line segments 120b and 120c and the angle formed by the line segments 120a and 120b) are about 90° and about 135°. The shape of the approximate arc is later described.

In the following, the inner honeycomb fired body and the outer honeycomb fired body in the honeycomb structure according to the embodiment of the present invention are described with reference to drawings.

Figure 5A:
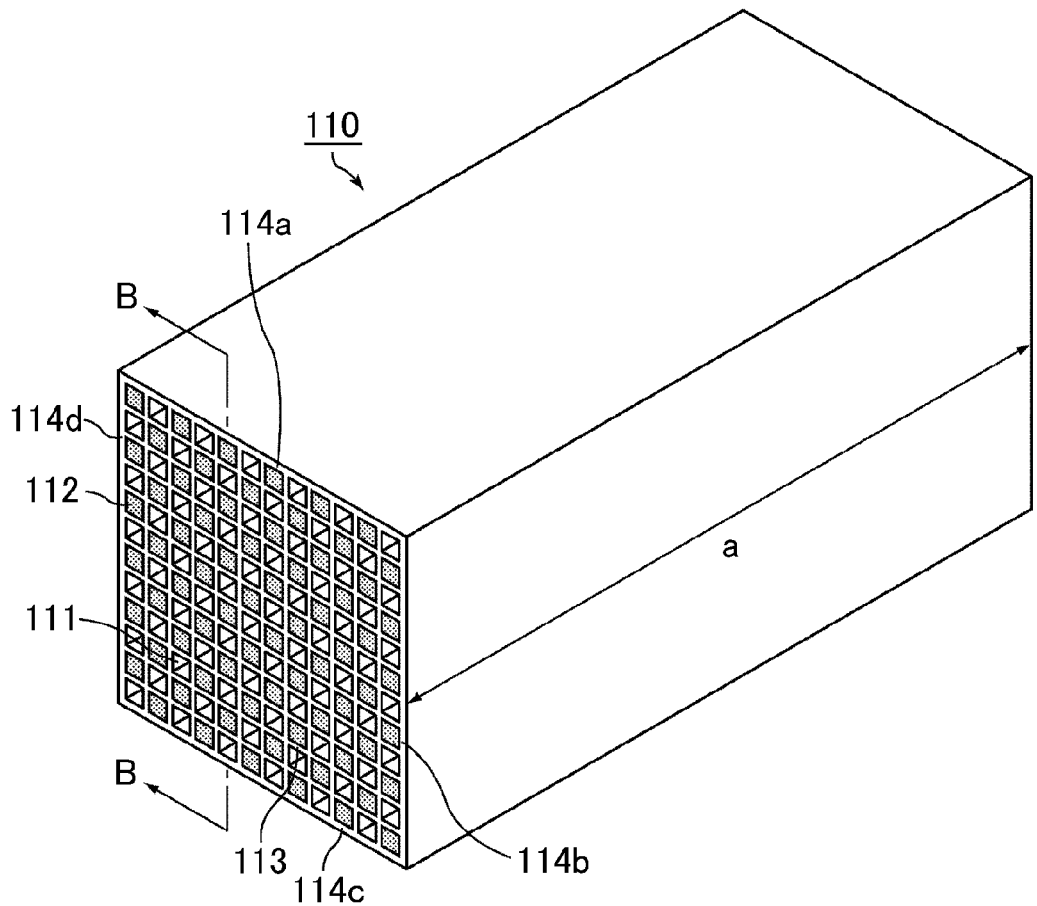
FIG. 5A is a perspective view schematically illustrating one example of an inner honeycomb fired body in the honeycomb structure of the first embodiment of the present invention.
Figure 5B:
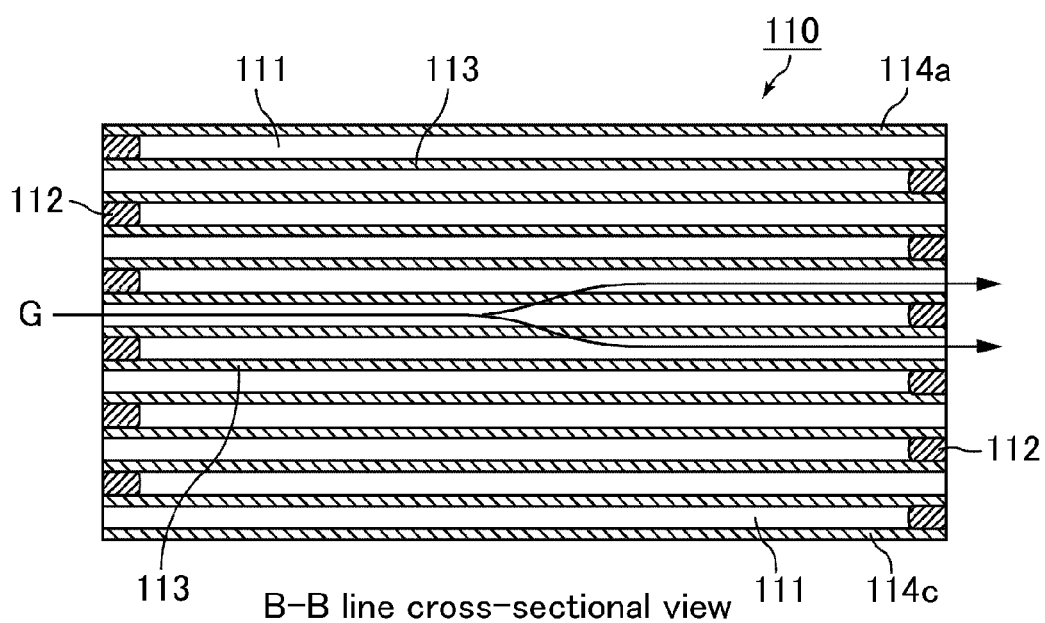
FIG. 5B is a B-B line cross sectional view of the inner honeycomb fired body illustrated in FIG. 5A.

FIG. 5A is a perspective view schematically illustrating one example of an inner honeycomb fired body in the honeycomb structure of the first embodiment of the present invention. FIG. 5B is a B-B line cross sectional view of the inner honeycomb fired body illustrated in FIG. 5A.

Figure 6A:
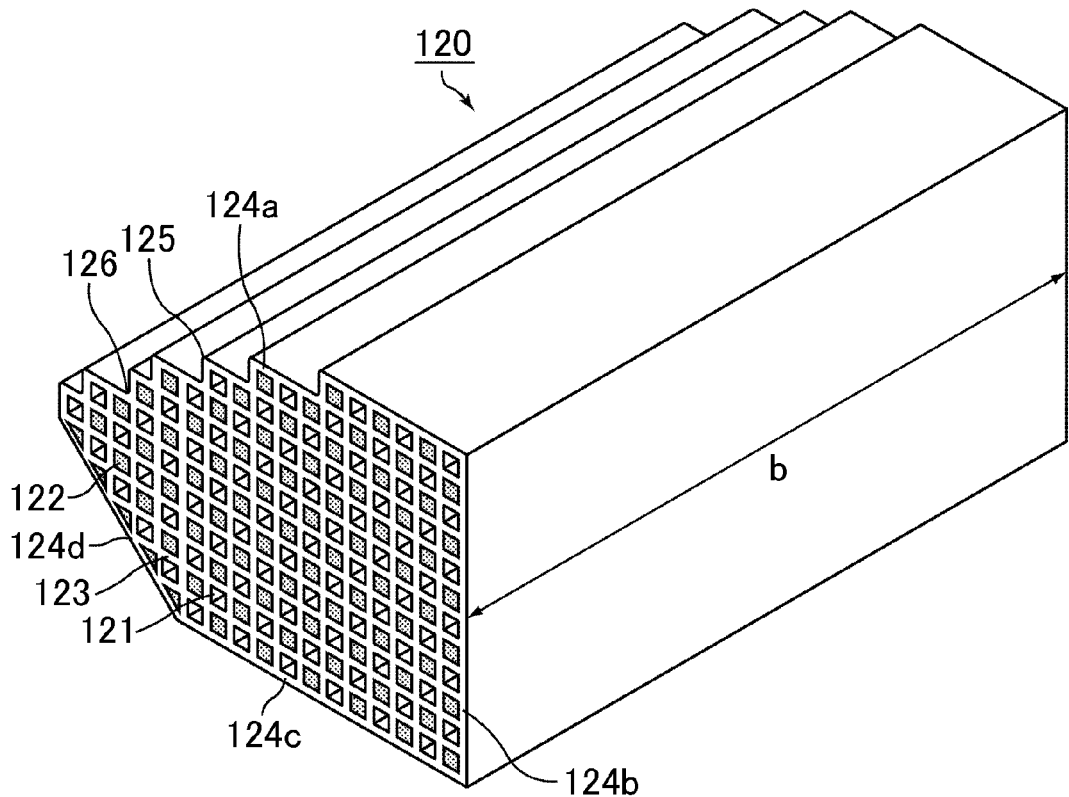
FIG. 6A is a perspective view schematically illustrating one example of an outer honeycomb fired body in the honeycomb structure of the first embodiment of the present invention.
Figure 6B:
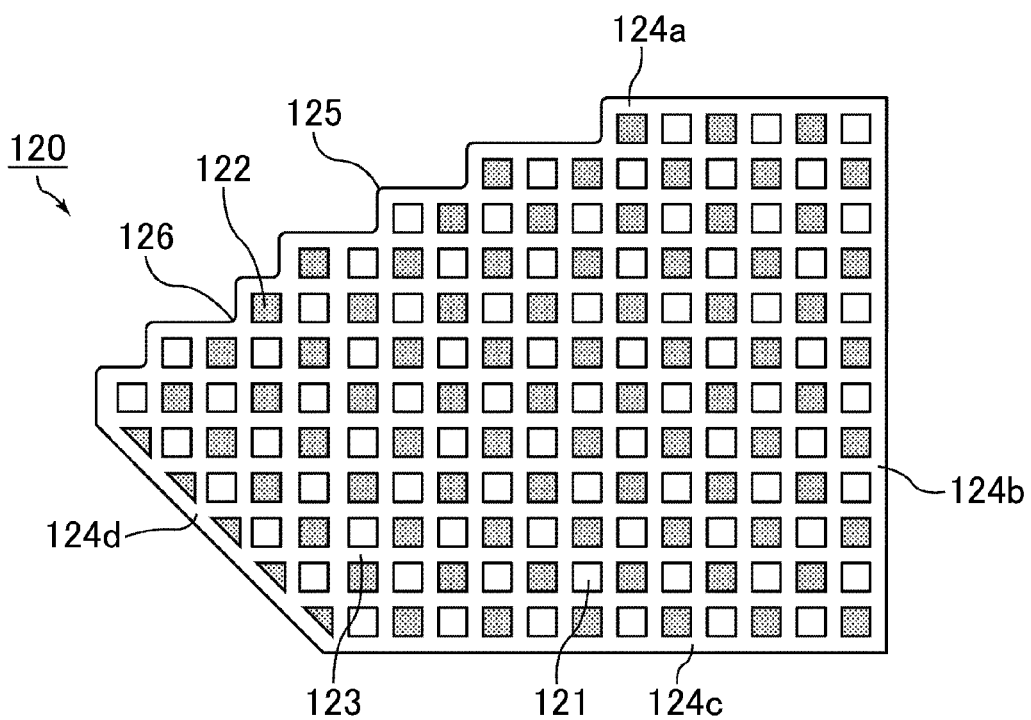
FIG. 6B is a side view of the outer honeycomb fired body illustrated in FIG. 6A.

FIG. 6A is a perspective view schematically illustrating one example of an outer honeycomb fired body in the honeycomb structure of the first embodiment of the present invention. FIG. 6B is a side view of the outer honeycomb fired body illustrated in FIG. 6A.

First, the inner honeycomb fired body is described.

In the honeycomb fired body 110 illustrated in FIGS. 5A and 5B, a large number of cells 111 are placed in parallel with one another in a longitudinal direction (direction of arrow "a" in FIG. 5A) with a cell wall 113 therebetween and peripheral walls 114a to 114d are formed around them. Either end portions of the cells 111 are sealed with a plug material 112.

Accordingly, exhaust gases G (exhaust gases are indicated by "G" and the flow of the exhaust gases are indicated by arrows in FIG. 5B) having flowed into one of the cells 111 with an opening on one end face surely pass through the cell wall 113 separating the cells 111, and flow out from another cell 111 with an opening on the other end face. When the exhaust gases G pass through the cell wall 113, the cell wall 113 captures PM and the like in the exhaust gases. Thus, the cell wall 113 functions as a filter.

The shapes of the cells 111 in a cross section perpendicular to the longitudinal direction of the inner honeycomb fired body 110 are all approximate quadrangles (approximate squares) and the cross-sectional areas of the cells 111 are approximately equal to one another. In addition, the cells 111 are formed so as to be positioned at equal intervals.

Next, the outer honeycomb fired body is described.

In the outer honeycomb fired body 120 illustrated in FIGS. 6A and 6B, a large number of cells 121 are placed in parallel with one another in a longitudinal direction (direction of arrow "b" in FIG. 6A) with a cell wall 123 therebetween and peripheral walls 124a to 124d are formed around them, in the same manner as in the inner honeycomb fired body. Either end portions of the cells 121 are sealed with a plug material 122.

Accordingly, exhaust gases having flowed into one of the cells 121 with an opening on one end face surely pass through the cell wall 123 separating the cells 121, and flow out from another cell 121 with an opening on the other end face. Here, the cell wall 123 functions as a filter. Namely, the outer honeycomb fired body 120 has a filtering function that is identical with the function of the inner honeycomb fired body 110, though its external shape is different from that of the inner honeycomb fired body 110.

Among the peripheral walls 124a to 124d of the outer honeycomb fired body 120, the peripheral wall 124a forming the periphery of the honeycomb structure (ceramic block) has a cross section perpendicular to the longitudinal direction in an approximate arc shape as above described. More specifically, as illustrated in FIGS. 6A and 6B, the peripheral wall 124a is a stepped peripheral wall provided with level differences formed by projected portions 125 and recessed portions 126 corresponding to the positions of the cells 121.

In the present embodiment, at least one of the projected portions and the recessed portions on the stepped peripheral wall are chamfered. Accordingly, at least one of the projected portions and the recessed portions are formed by at least one of curve lines and straight lines in a cross section perpendicular to the longitudinal direction of the honeycomb fired body. Namely, the cross section (perpendicular to the longitudinal direction of the honeycomb fired body) of the chamfered part is formed by at least one of curve lines and straight lines.

In FIGS. 6A and 6B, the projected portions 125 and the recessed portions 126 on the stepped peripheral wall 124a are chamfered. Therefore, the projected portions 125 and the recessed portions 126 are formed by curve lines in the cross section perpendicular to the longitudinal direction of the honeycomb fired body.

In the following, chamfering carried out on at least one of the projected portions and the recessed portions of the peripheral wall is described with reference to drawings.

FIGS. 7A, 7B, 7C, and 7D are partially enlarged cross-sectional views each schematically illustrating one example of a shape of the chamfered projecting portion according to an embodiment of the present invention. FIGS. 7E, 7F, 7G, and 7H are partially enlarged cross-sectional views each schematically illustrating one example of a shape of the chamfered recessed portion according to an embodiment of the present invention.

In the present description, when the projected portion has a cross-sectional shape in which the corner portion is cut away, as illustrated in FIGS. 7A, 7B, 7C, and 7D, such a state is referred to as a state where "the projected portion is chamfered". On the other hand, when the recessed portion has a cross-sectional shape as illustrated in FIGS. 7E, 7F, 7G, and 7H, namely, the shape in which, assuming that a hypothetical projected portion are fitted in the recessed portion, the hypothetical projected portion is chamfered (the shape of the corner portion that fits the virtually chamfered hypothetical projected portion), such a state is referred to as a state where "the recessed portion is chamfered".

The shape of the chamfering carried out on the recessed portion may be also considered as a shape in which the recessed portion is provided with a filled part.

A practical method for forming the projected portion and the recessed portion of the peripheral wall in the shapes as above described is not particularly limited, and an exemplary method is a extrusion-molding method with use of a die manufactured in a shape for molding the above-described shape.

Figure 7A:
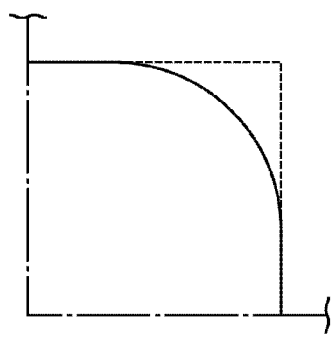
FIGS. 7A, 7B, 7C, and 7D are partially enlarged cross-sectional views each schematically illustrating one example of a shape of the chamfered projecting portion according to an embodiment of the present invention.
Figure 7E:
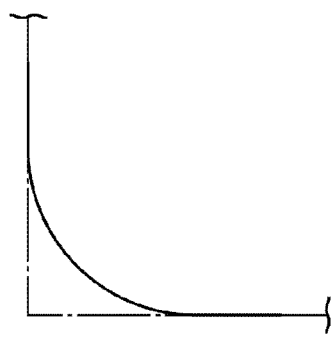
FIGS. 7E, 7F, 7G, and 7H are partially enlarged cross-sectional views each schematically illustrating one example of a shape of the chamfered recessed portion according to an embodiment of the present invention.

FIGS. 7A and 7E illustrate the shape of the corner portion chamfered into an arc. This chamfering is referred to as R chamfering.

Figure 7B:
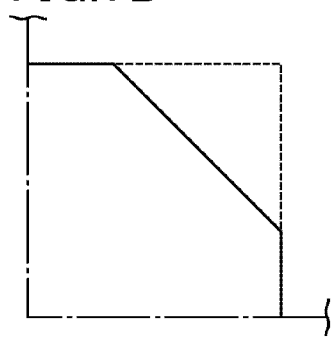
Figure 7F:
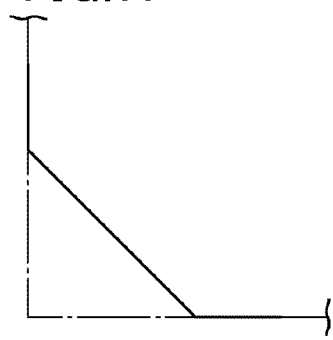
Figure 7C:
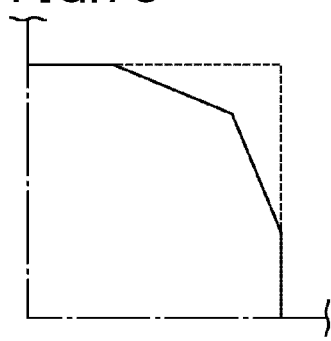

FIGS. 7B and 7F illustrate the shape of the corner portion chamfered in a manner that the projected portion or the hypothetical projected portion is cut off by a single straight line so as to have obtuse corners only. This chamfering is referred to as C-chamfering.

FIGS. 7C, 7D, 7G, and 7H illustrate the shapes of the corner portions chamfered in a manner the corner portions are cut off by a plurality of straight lines.

The chamfering carried out on at least one of the projected portions and the recessed portions of the peripheral wall is preferably R-chamfering or C-chamfering, and more preferably R-chamfering.

In the case that the R-chamfering is carried out on at least one of the projected portions and the recessed portions of the peripheral wall, the lower limit of the radius of curvature of the R-chamfering is preferably about 0.3 mm and more preferably about 0.5 mm. The upper limit thereof is preferably about 2.5 mm.

When the radius of curvature of the R-chamfering is about 0.3 mm or more, it becomes easier to prevent the stress concentration to the projected portion or the recessed portion of the peripheral wall due to a contact with a jig and the like during the transfer or expansion and contraction of the honeycomb fired body exposed to high temperatures. When the radius of curvature of the R-chamfering is about 2.5 mm or less, it becomes easier to avoid a problem that the too-large curve of the projected portion or the recessed portion of the peripheral wall makes it harder to carry out the chamfering.

Here, the radius of curvature of the R-chamfering refers to a radius of the arc formed by the R-chamfering that shapes the corner portions into arcs.

In the case that the C-chamfering is carried out on at least one of the projected portions and the recessed portions of the peripheral wall, the lower limit of the length of the C-chamfering is preferably about 0.3 mm, and more preferably about 0.5 mm. The upper limit thereof is preferably about 2.5 mm.

The length of the C-chamfering refers to a length of the longer side that is cut off in the C chamfering, out of two sides originally forming the corner portion.

The chamfering may be carried out on at least one of the projected portions and the recessed portions of the peripheral wall with respect to one or more parts thereof, and the position to be chamfered is not particularly limited.

However, the chamfering is preferably carried out on as many parts as possible. The chamfering is more preferably carried out on all the projected portions and the recessed portions, which form the level differences on the peripheral wall.

In the present embodiment, at least one of the projected portions and the recessed portions are preferably formed only by curve lines by the R-chamfering carried out thereon, in a cross section perpendicular to the longitudinal direction of the honeycomb fired body. In particular, the projected portions and the recessed portions are more preferably formed only by curve lines by the R chamfering carried out on all the projected portions and the recessed portions of the peripheral wall, in a cross section perpendicular to the longitudinal direction of the honeycomb fired body.

As illustrated in FIGS. 6A and 6B, the shapes of the cells 121 in the honeycomb fired body 120 are all approximate quadrangles (approximate squares), in a cross section perpendicular to the longitudinal direction, and the cross-sectional areas thereof are all approximately equal to one another. In addition, the cells 121 are designed so as to be positioned at equal intervals. Moreover, the cross-sectional shapes of the cell contacting with the peripheral wall and of the cell not contacting with the peripheral wall are approximately the same.

The thickness of the stepped peripheral wall 124a is approximately constant throughout the entire wall except the projected portions and the recessed portions. In addition, the thickness of the stepped peripheral wall 124a except the projected portions and the recessed portions is approximately the same as the thickness of the cell wall 123 and of the other peripheral walls 124b to 124d.

Next, a method for manufacturing the honeycomb structure of the present embodiment is described. Here, a case is described where silicon carbide is used as ceramic powder.

(1) A wet mixture containing ceramic powder and a binder is extrusion-molded to manufacture a honeycomb molded body.

More specifically, silicon carbide powders having different average particle sizes as ceramic powder, an organic binder, a liquid plasticizer, a lubricant, and water are mixed to prepare a wet mixture for manufacturing a honeycomb molded body.

Then, the wet mixture is charged into an extrusion molding machine and extrusion-molded to manufacture honeycomb molded bodies in predetermined shapes.

Here, various dies for extrusion-molding are used in accordance with the shape of the honeycomb fired bodies such as a honeycomb fired body having an approximate quadrangle (approximate square) cross section (honeycomb molded body to be an inner honeycomb fired body), and a honeycomb fired body having a cross section surrounded by three line segments and one approximate arc, with the two angles of about 90° and about 135° made by two line segments out of the three line segments (honeycomb molded body to be an outer honeycomb fired body).

In the following, the honeycomb molded body refers to these two kinds of honeycomb molded bodies without distinction.

(2) Next, the honeycomb molded bodies are cut at a predetermined length and dried with use of a drying apparatus such as a microwave drying apparatus, a hot-air drying apparatus, a dielectric drying apparatus, a reduced-pressure drying apparatus, a vacuum drying apparatus, and a freeze drying apparatus. Then, predetermined cells are sealed by filling the cells with a plug material paste to be a plug material.

Here, the plug material paste may be a paste having the same composition as that of the wet mixture.

(3) Then, degreasing for heating organic matters in the honeycomb molded body in a degreasing furnace is carried out. The degreased honeycomb molded body is transferred to a firing furnace and fired. In this manner, the inner honeycomb fired body as illustrated in FIGS. 5A and 5B and the outer honeycomb fired body as illustrated in FIGS. 6A and 6B are manufactured.

Conditions for cutting, drying, sealing, degreasing, and firing may be conditions conventionally used for manufacturing honeycomb fired bodies.

(4) Next, an adhesive paste is applied to a predetermined side faces of the inner honeycomb fired body and the outer honeycomb body, which have cells each sealed at a predetermined end portion, to form adhesive paste layers. On each of the adhesive paste layers, another honeycomb fired body is sequentially laminated so that a predetermined number of honeycomb fired bodies are bound to form a ceramic block.

Here, the adhesive paste contains, for example, an inorganic binder, an organic binder, and inorganic particles. The adhesive paste may further contain at least one of an inorganic fiber and a whisker.

(5) Thereafter, a coating material paste is applied to the peripheral face of the approximate round pillar-shaped ceramic block, and is dried to be solidified to produce a coat layer.

In applying the coating material paste to the peripheral face of the ceramic block, the coating material paste is applied in a manner such that the recessed portion provided on the outer honeycomb fired body is filled.

The adhesive paste may be used as the coating material paste. Or alternatively, the coating material paste may be a paste having a composition different from that of the adhesive paste.

It is to be noted that the coat layer is not necessarily formed and may be formed according to need.

In this manner, it is possible to manufacture the honeycomb structure of the present embodiment.

Hereinafter, the effects of the honeycomb structure of the present embodiment are listed.

(1) In the honeycomb structure of the present embodiment, the peripheral wall forming the periphery of the ceramic block, among the peripheral walls of the honeycomb fired body, is provided with level differences formed by projected portions and recessed portions in a cross section perpendicular to the longitudinal direction of the honeycomb fired body.

Therefore, it becomes easier to reduce the number of incomplete cells positioned at the outermost periphery of the honeycomb structure. This is likely to increase the cross-sectional area of the cells positioned at the outermost periphery of the honeycomb structure, and therefore, the filtering area is increased so that the capturing efficiency of PM is more likely to be improved. In addition, the pressure loss is more likely to be improved. Further, filling of the cells with a plug material paste also is more likely to be facilitated so that the defective sealing is more likely to be reduced. As a result, the manufacturing efficiency of the honeycomb structure is more likely to be improved.

(2) In the honeycomb structure of the present embodiment, at least one of the projected portions and the recessed portions of the peripheral wall are chamfered so that at least one of the projected portions and the recessed portions are formed by at least one of curve lines and straight lines in a cross section perpendicular to the longitudinal direction of the honeycomb fired body.

Accordingly, it becomes easier to avoid a chipped projected portion of the peripheral wall or a partially-thin recessed portion of the peripheral wall due to the insufficient amount of the wet mixture filled into the projected portion or the recessed portion of the die in extrusion molding for manufacturing a honeycomb molded body. In addition, it becomes also easier to avoid other defectives, such as the projected portion on the peripheral wall of the honeycomb molded body being chipped due to a contact with a transfer jig and the like during a drying process, a firing process, a binding process, or the like after the extrusion molding for manufacturing a honeycomb fired body included in the honeycomb structure, and a crack starting from the recessed portion of the peripheral wall due to expansion and contraction caused by the temperature change in the drying treatment, the firing treatment, or the like. As a result, defects of the honeycomb molded body and the honeycomb fired body are more likely to be reduced so that the manufacturing efficiency of the honeycomb structure is more likely to be improved.

Additionally, it becomes easier to prevent defects such as a chip and a crack which are generated in the peripheral portion of the honeycomb structure, also in manufacturing the honeycomb structure of the present embodiment or in use of the honeycomb structure as a honeycomb filter.

EXAMPLES

Example 1

Hereinafter, examples are given for more specifically describing the first embodiment of the present invention. However, the present invention is not limited only to these examples.

(1) An amount of 52.8% by weight of a silicon carbide coarse powder having an average particle size of 22 µm and 22.6% by weight of a silicon carbide fine powder having an average particle size of 0.5 µm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded.

In this process, there were manufactured: a raw honeycomb molded body having approximately the same shape as that of the inner honeycomb fired body 110 illustrated in FIGS. 5A and 5B with cells not sealed; and a raw honeycomb molded body having approximately the same shape as that of the outer honeycomb fired body 120 illustrated in FIGS. 6A and 6B with cells not sealed.

(2) Next, the raw honeycomb molded bodies were dried by using a microwave drying apparatus to obtain dried honeycomb molded bodies. Predetermined cells were sealed by filling the cells with a plug material paste having the same composition as that of the wet mixture. Thereafter, the dried honeycomb molded bodies, which have predetermined cells filled with the plug material paste, were dried by using a drying apparatus again.

(3) The dried honeycomb molded bodies having cells sealed were degreased at 400° C., and then fired at 2200° C. under normal pressure argon atmosphere for three hours.

In this manner, an inner honeycomb fired body and an outer honeycomb fired body were manufactured.

The inner honeycomb fired body includes a porous silicon carbide sintered body and has a porosity of 45%, an average pore size of 15 µm, a size of 34.5 mm×34.5 mm×150 mm, the number of cells (cell density) of 46.5 pcs/cm$^2$ (300 pcs/inch$^2$), a thickness of cell walls of 0.25 mm (10 mil), and a width of the cell of 1.42 mm.

Also, the outer honeycomb fired body includes a porous silicon carbide sintered body and has the same porosity, the same average pore size, the same number of cells (cell density), the same thickness of cell walls, and the same width of the cell as those of the inner honeycomb fired body. Further, the outer honeycomb fired body has a cross-sectional shape surrounded by three line segments and an approximate arc, with the two angles, formed by two line segments out of these three line segments, being 90° and 135° (line segment 120$a$=20.8 mm, line segment 120$b$=35.0 mm, and line segment 120$c$=35.7 mm as illustrated in FIG. 4). The approximate arc 120$d$ of the outer honeycomb fired body is a stepped peripheral wall provided with level differences each formed by a projected portion and a recessed portion. R chamfering is carried out on all the projected portions and the recessed portions, and the radius of curvature of the R chamfering is 0.5 mm.

(4) An adhesive paste was applied to predetermined side faces of the inner honeycomb fired body and the outer honeycomb fired body, and four pieces of the inner honeycomb fired bodies and eight pieces of the outer honeycomb fired bodies were bonded to one another with the adhesive paste interposed therebetween so as to be arranged as shown in FIG. 3. In this manner an aggregated body of the honeycomb fired bodies was manufactured.

The aggregated body of the honeycomb fired bodies was heated at 180° C. for 20 minutes to dry and solidify the adhesive paste. In this manner, a round pillar-shaped ceramic block having the adhesive layer of 1 mm in thickness was manufactured.

Here, as the adhesive paste, an adhesive paste containing 30.0% by weight of silicon carbide particles having an average particle size of 0.6 µm, 21.4% by weight of silica sol (solids content of 30% by weight), 8.0% by weight of carboxymethyl cellulose and 40.6% by weight of water, was used.

(5) By using a coating material paste having the same composition as that of the adhesive paste used in the process (4), a coating material paste layer was formed on the peripheral portion of the ceramic block. The coating material paste was applied so as to fill the recessed portions provided on the outer honeycomb fired body.

Thereafter, the coating material paste layer was dried and solidified at 120° C. to manufacture a round pillar-shaped honeycomb structure having a size of 143.8 mm in diameter× 150 mm in length with a coat layer formed on the periphery thereof.

Second Embodiment

In the following, a second embodiment that is one embodiment of the present invention is described.

An inner honeycomb fired body and an outer honeycomb fired body forming a honeycomb structure of the present embodiment have approximately similar external shapes as the inner honeycomb fired body and the outer honeycomb fired body of the first embodiment of the present invention. In addition, the outer honeycomb fired bodies and the inner honeycomb fired bodies which form the ceramic block (honeycomb structure) are combined in approximately the same way as in the first embodiment of the present invention.

In the outer honeycomb fired body of the present embodiment, cells contacting with the stepped peripheral wall include incomplete cell(s) having a cross-sectional shape different from the cell not contacting with the stepped peripheral wall, whereas the cells contacting with the peripheral wall and the cell not contacting with the peripheral wall have approximately the same cross-sectional shape in the outer honeycomb fired body of the first embodiment of the present invention.

In the present description, the complete cell refers to a cell which belongs to a minimum unit of cells in the honeycomb fired body repeatedly formed laterally and vertically in a cross section perpendicular to the longitudinal direction of the honeycomb fired body. The minimum unit of cells includes a combination of cells having one or more kinds of cell shapes. For example, in the outer honeycomb fired body 120 illustrated in FIGS. 6A and 6B, approximate square cells are repeatedly formed in a cross section perpendicular to the longitudinal direction of the outer honeycomb fired body. In that case, the approximate square cell is the complete cell. For another example, in the inner honeycomb fired body 310 illustrated in FIG. 8A, two kinds of cells having different cell cross-sectional areas are repeatedly formed. In this case, the complete cell refers to a combination of two kinds of cells having different cross-sectional areas. However, there may be a case where one of the two kinds of cells is conveniently referred to as a complete cell.

The basic formation pattern in the present description refers to a shape of the complete cell.

In the present description, the incomplete cell refers to one kind of the peripheral cell contacting with the peripheral wall of the outer honeycomb fired body. More specifically, the incomplete cell has a partially-chipped shape compared with the shape of the complete cell and has a cell cross-sectional area smaller than that of the complete cell in a cross section of the honeycomb fired body perpendicular to the longitudinal direction. In the case that one kind of cell constitutes the complete cell, the cell having a cell cross-sectional area smaller than that of the complete cell is referred to as the incomplete cell. In the outer honeycomb fired body in which two or more kinds of cells having different cross-sectional areas constitute the complete cell in combination, the incomplete cell refers to, for example, a cell having a cell cross-sectional area smaller than that of the complete cell having a relatively large cross-sectional area, or a cell having a cell cross-sectional area smaller than that of the cell having a relatively small cross sectional area.

In the following, the outer honeycomb fired body in the honeycomb structure of the second embodiment of the present invention is described.

Figure 9A:
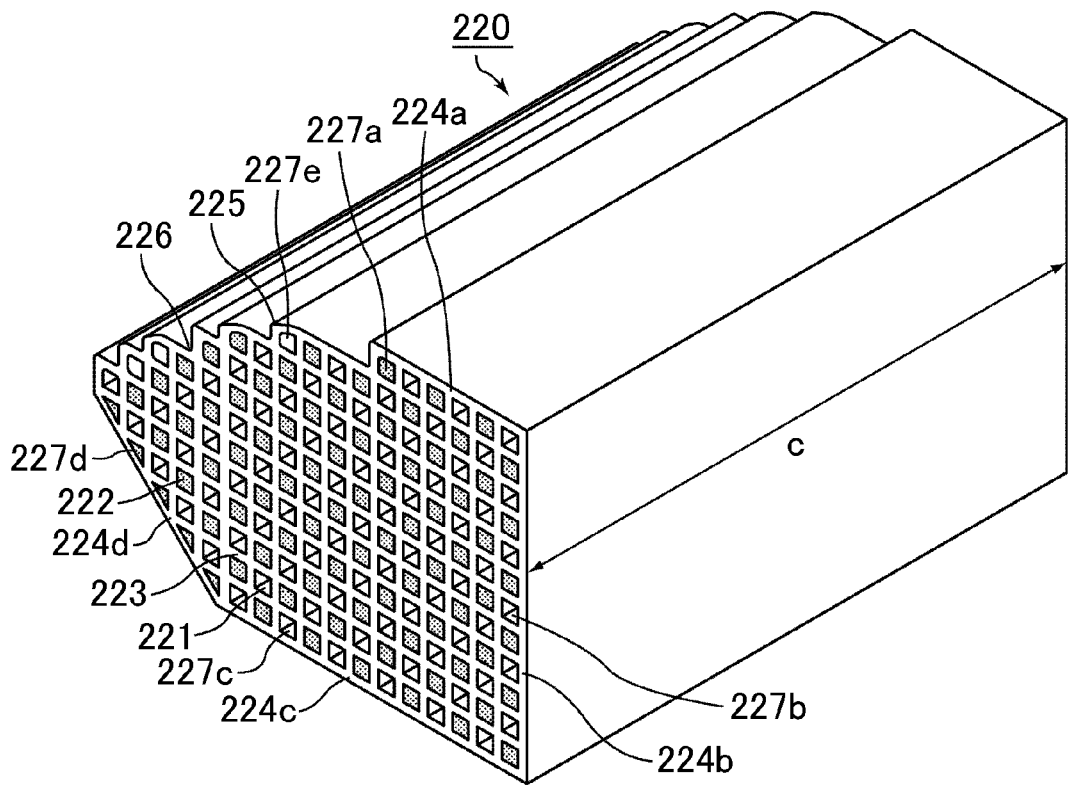
FIG. 9A is a perspective view schematically illustrating one example of an outer honeycomb fired body in a honeycomb structure of a second embodiment of the present invention.
Figure 9B:
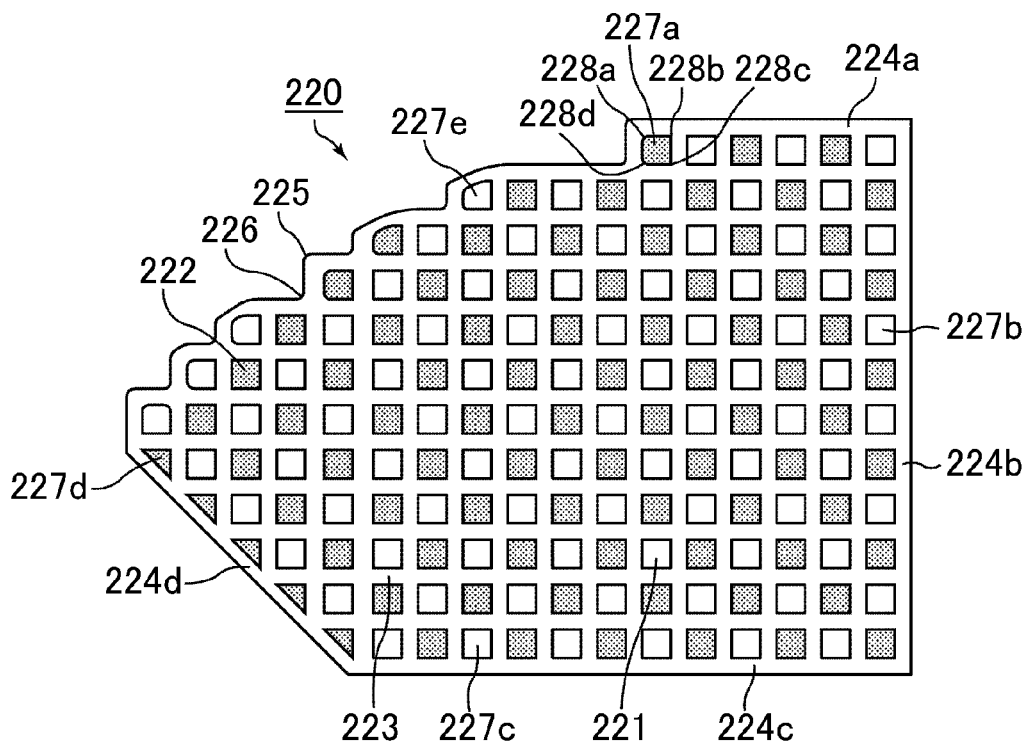
FIG. 9B is a side view of the outer honeycomb fired body illustrated in FIG. 9A.

FIG. 9A is a perspective view schematically illustrating one example of the outer honeycomb fired body in the honeycomb structure of the second embodiment of the present invention. FIG. 9B is a side view of the outer honeycomb fired body illustrated in FIG. 9A.

In an outer honeycomb fired body 220 illustrated in FIGS. 9A and 9B, cells 221, 227a to 227e are placed in parallel with one another in a longitudinal direction (direction of arrow "c" in FIG. 9A) with a cell wall 223 therebetween and peripheral walls 224a to 224d are formed around them. Either end portions of the cells 221, 227a to 227e are sealed with plug materials 222.

The peripheral wall 224a forming the periphery of the honeycomb structure (ceramic block), among the peripheral walls 224a to 224d, is a stepped peripheral wall provided with level differences formed by projected portions 225 and recessed portions 226.

In the outer honeycomb fired body 220, the cells 221, 227a to 227e include peripheral cells 227a to 227e contacting with the peripheral walls 224a to 224d and inner cells 221 positioned under the peripheral cells 227a to 227e.

The inner cells 221 are formed in a checkered pattern as the basic formation pattern. The cross-sectional shape of the inner cells 221 is approximately quadrangle (approximately square) and the cross-sectional areas thereof are approximately equal to one another. Accordingly, since the inner cells 221 are formed based on the basic formation pattern, all the inner cells 221 are complete cells.

Among the peripheral cells 227a to 227e, the peripheral cell 227a contacting with the peripheral wall 224a, the peripheral cell 227b contacting with the peripheral wall 224b, and the peripheral cell 227c contacting with the peripheral wall 224c have cross-sectional shapes approximately the same as that of the inner cell 221. Namely, the peripheral cells 227a, 227b, and 227c are complete cells. This case is caused by the inner cell 221 formed based on the basic formation pattern which comes in contact with the peripheral walls 224a, 224b, or 224c to be the peripheral cell 227a, 227b, or 227c.

On the other hand, the peripheral cells 227d and 227e have cross-sectional shapes different from that of the inner cell 221 that is the complete cell. Namely, the peripheral cells 227d and 227e are incomplete cells having cross-sectional shapes different from that of the complete cell.

As above described, the cell not formed based on the basic formation pattern, namely, the cell smaller than the approximate quadrangle (approximate square) of the inner cell as the basic formation pattern in the cross section perpendicular to the longitudinal direction, is referred to as the incomplete cell.

As above, in the present embodiment, the peripheral cells include, in addition to the complete cells, incomplete cells having cross-sectional shapes different from that of the complete cell.

The peripheral cell 227e as the incomplete cell is provided so as to contact with the stepped peripheral wall 224a. In the same manner, the peripheral cell 227d as the incomplete cell is provided so as to contact with the peripheral wall 224d. As above described, the stepped peripheral wall 224a forms the periphery of the ceramic block. Therefore, the peripheral cell 227e is formed at the position contacting with the peripheral wall forming the periphery of the ceramic block among the peripheral walls provided in the honeycomb fired body included in the honeycomb structure.

Accordingly, the cross-sectional shape of the peripheral cells other than the incomplete cells is an approximate quadrangle (approximate square) and the cross-sectional areas thereof are approximately equal to one another, in approximately the same manner as in the inner cell.

In the present embodiment, the peripheral cells contacting with the stepped peripheral wall of the outer honeycomb fired body may include at least one incomplete cell. The number of the incomplete cells is not particularly limited as long as the stepped peripheral wall is provided with level differences. Namely, the incomplete cells may be provided in consideration of the shape of the peripheral walls of the outer honeycomb fired bodies and the shape of the peripheral cell defined by the peripheral wall.

The cross-sectional area of the incomplete cell is not particularly limited, and it may be a predetermined size which allows easy filling of the cell with a plug material paste so as not to cause defective sealing.

More specifically, the incomplete cell preferably has a cross section perpendicular to the longitudinal direction in which a circle having a diameter of about 0.90 mm can be drawn. The incomplete cell more preferably has a cross section perpendicular to the longitudinal direction in which a circle having a diameter of about 0.95 mm can be drawn.

In such a case, a plug material paste easily fills the cell and is less likely to be leak or protrude from the cell. As a result, the incomplete cell is more likely to be sealed favorably and defective sealing is less likely to occur.

In the same manner as in the first embodiment, at least one of the projected portions and the recessed portions present on the stepped peripheral wall are chamfered also in the present embodiment. Therefore, at least one of the projected portions and the recessed portions are formed by at least one of curve lines and straight lines in a cross section perpendicular to the longitudinal direction of the honeycomb fired body.

In FIGS. 9A and 9B, the projected portions 225 and the recessed portions 226 on the stepped peripheral wall 224a are chamfered so as to be formed by curve lines in the cross section perpendicular to the longitudinal direction of the honeycomb fired body.

Additionally, in the present embodiment, corner portions are formed on the inner wall of the peripheral cells and at least one of the corner portions is chamfered.

The chamfering on the corner portion of the peripheral cell may be regarded as a filled portion provided at the corner portion of the peripheral cell. In such a case, the cross-sectional shape of the filled portion is not particularly limited and is preferably an approximately right angled triangle, or an approximately right angled triangle in which the hypotenuse curves or flexes inwardly or outwardly. Here, when the approximately right angled triangle is an approximately right angled isosceles triangle, the filled portion has a symmetric shape with respect to the corner portion. This shape is more likely to allow well-balanced weight and heat conduction around the corner portion, so that heat and stress are more likely to be dispersed efficiently. Therefore, the right angled isosceles triangle is particularly preferable.

It is possible to consider the shape (cross-sectional shape perpendicular to the longitudinal direction of the cell) of the chamfering carried out on the corner portion of the peripheral cell as same as the shape illustrated in FIGS. 7E, 7F, 7G, and 7H.

Figure 7G:
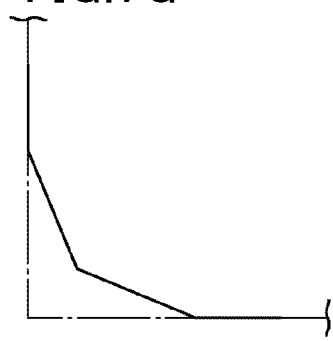
Figure 7D:
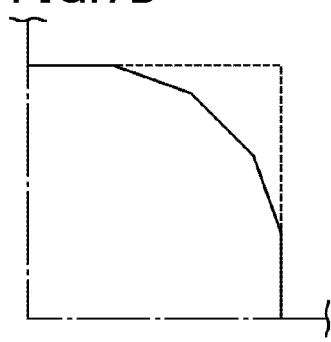
Figure 7H:
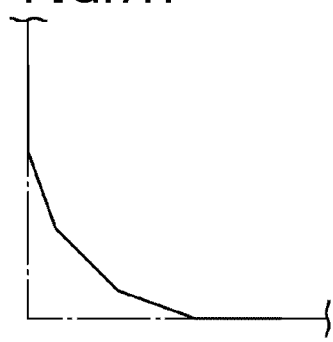

In such a case, "the shape of the curving or flexing hypotenuse" refers to a smooth curve connecting two vertexes of the acute angles out of three vertexes of the approximately right angled triangle as illustrated in FIG. 7E, or a shape formed by one or more lines connecting two vertexes of the acute angles of the approximately right angled triangle as illustrated in FIGS. 7F, 7G, and 7H.

The chamfering carried out on the corner portion of the peripheral cell is preferably R-chamfering or C-chamfering, and is more preferably R-chamfering.

When R-chamfering is carried out on the corner portion of the peripheral cell, the lower limit of the radius of curvature is preferably about 0.3 mm and more preferably about 0.5 mm. The upper limit thereof is preferably about 2.5 mm.

When the radius of curvature of the R-chamfering is about 0.3 mm or more, it becomes easier to prevent the stress concentration in the projected portion or the recessed portion. In contrast, when the radius of curvature of the R-chamfering is about 2.5 mm or less, the curve of the corner portion of the peripheral cell is not too large so that a crack is less likely to occur.

When the C-chamfering is carried out on the corner portion of the peripheral cell, the lower limit of the length of the C-chamfering is preferably about 0.3 mm and more preferably about 0.5 mm. The upper limit thereof is preferably about 2.5 mm.

The chamfering may be carried out on at least one part of the corner portions of the peripheral cells. Accordingly, the corner portion of the complete cell may be chamfered, or alternatively, the corner portion of the incomplete cell may be chamfered. In particular, the corner portion of the peripheral cell contacting with the stepped peripheral wall is preferably chamfered, among the peripheral cells.

Further, the positions of the chamfered sites in the cell are not particularly limited, and they are preferably the corner portion formed by the stepped peripheral wall and the corner portion formed by the stepped peripheral wall and the cell wall.

"The corner portion formed by the stepped peripheral wall" refers to a corner portion positioned closest to the projected portion of the stepped peripheral wall out of the corner portions of the peripheral cells contacting with the stepped peripheral wall.

"The corner portion formed by the stepped peripheral wall and the cell wall" refers to a corner portion present at the branch point of the stepped peripheral wall and the cell wall out of the corner portions of the peripheral cells contacting with the stepped peripheral wall. In the outer honeycomb fired body 220 illustrated in FIG. 9B, a corner portion 228a is a "corner portion formed by the stepped peripheral wall" and a corner portion 228d is a "corner portion formed by the stepped peripheral wall and the cell wall", among corner portions 228a to 228d of the peripheral cell 227a.

Next, an inner honeycomb fired body included in the honeycomb structure of the second embodiment of the present invention is described.

The inner honeycomb fired body has a configuration similar to that of the inner honeycomb fired body of the first embodiment of the present invention.

Cells provided in the inner honeycomb fired body are all complete cells. The corner portion of the peripheral cell in the inner honeycomb fired body (cell contacting with the peripheral wall of the inner honeycomb fired body) may or may not be chamfered.

With regard to the method for manufacturing the honeycomb structure of the present embodiment, the honeycomb structure may be manufactured in approximately the same manner as in the first embodiment of the present invention, except that a die used for extrusion-molding is changed to manufacture a honeycomb molded body in a predetermined shape.

In the present embodiment, not only the effects (1) and (2) described in the first embodiment of the present invention, but also the following effects may be exerted.

(3) In the honeycomb structure of the present embodiment, the peripheral cells contacting with the stepped peripheral wall include incomplete cell (s). Therefore, it becomes easier to reduce the number of the projected or recessed portions on the stepped peripheral wall of the honeycomb fired body in the cross section perpendicular to the longitudinal direction of the honeycomb fired body. As a result, it becomes easier to prevent a case that the insufficient amount of the wet mixture introduced to the projected or recessed portion of the die causes a chipped projected portion of the peripheral wall or a partially-thin recessed portion of the peripheral wall. In addition, it becomes easier to further prevent the projected portion on the peripheral wall of the honeycomb molded body or the honeycomb fired body being chipped due to a contact with a jig and the like in the drying process, the firing process, or the like after the extrusion molding, and cracks starting from at least one of the projected portion and the recessed portion of the peripheral wall due to expansion and contraction of the honeycomb fired body when the honeycomb fired body is subjected to high temperatures.

Moreover, when such a honeycomb structure is used as an exhaust gas-purifying filter, it becomes easier to increase the filtering area for capturing PM so that the pressure loss is more likely to be lowered.

(4) In the honeycomb structure of the present embodiment, at least one of the corner portions of the peripheral cells (corner portions formed on the inner wall of the peripheral cell) is chamfered. The chamfering on the corner portion of the peripheral cell is more likely to relax the stress compared to the case in which the corner portion of the peripheral cell is sharp. Accordingly, it becomes easier to further prevent the projected portion on the peripheral wall of the honeycomb molded body or the honeycomb fired body being chipped due to a contact with a jig and the like in the drying process, the firing process, and the like after the extrusion-molding, cracks starting from at least one of the projected portion and the recessed portion of the peripheral wall due to expansion and contraction of the honeycomb fired body when the honeycomb fired body is subjected to high temperatures, and the like.

(5) In the honeycomb structure of the present embodiment, the chamfered corner portions include a corner portion formed by the stepped peripheral wall and a corner portion formed by the stepped peripheral wall and the cell wall.

The chamfering on the corner portion formed by the stepped peripheral wall and on the corner portion formed by the stepped peripheral wall and the cell wall, among the corner portions of the peripheral cells, is more likely to relax the stress on the projected or recessed portion on the stepped peripheral wall of the honeycomb fired body. Therefore, it becomes easier to further avoid a chipped projected portion of the peripheral wall, occurrence of cracks starting from at least one of the projected portions and the recessed portions of the peripheral wall, and the like.

In addition, since the thickness of the stepped peripheral wall of the honeycomb fired body, including the thickness of the peripheral wall at the projected portion, is more likely to be approximately constant, it becomes easier to avoid deformation of the peripheral wall of the honeycomb molded body in extrusion molding.

(6) In the honeycomb structure of the present embodiment, chamfering carried out on the corner portion is R-chamfering, and the radius of curvature thereof is from about 0.3 mm to about 2.5 mm.

The corner portion of the peripheral cell is made to have a curve shape by R-chamfering in a cross section perpendicular to the longitudinal direction of the honeycomb fired body, and therefore, the honeycomb structure is excellent in stress relaxation. Accordingly, it becomes easier to further avoid occurrence of cracks and the like starting from at least one of the projected portion and the recessed portion of the peripheral wall.

Third Embodiment

In the following, a third embodiment that is one embodiment of the present invention is described.

Each of an inner honeycomb fired body and an outer honeycomb fired body forming a honeycomb structure of the present embodiment has approximately the similar external shape as each of the inner honeycomb fired body and the outer honeycomb fired body forming the honeycomb structure of the second embodiment of the present invention. In addition, the combination of the outer honeycomb fired bodies and the inner honeycomb fired bodies for forming a ceramic block (honeycomb structure) is also approximately similar to that in the second embodiment of the present invention.

According to the present embodiment, in the inner honeycomb fired body and the outer honeycomb fired body, inner cells and peripheral cells other than incomplete cells include large volume cells and small volume cells. The large volume cell has a cross sectional area larger than that of the small volume cell, in a cross section perpendicular to the longitudinal direction.

Figure 8A:
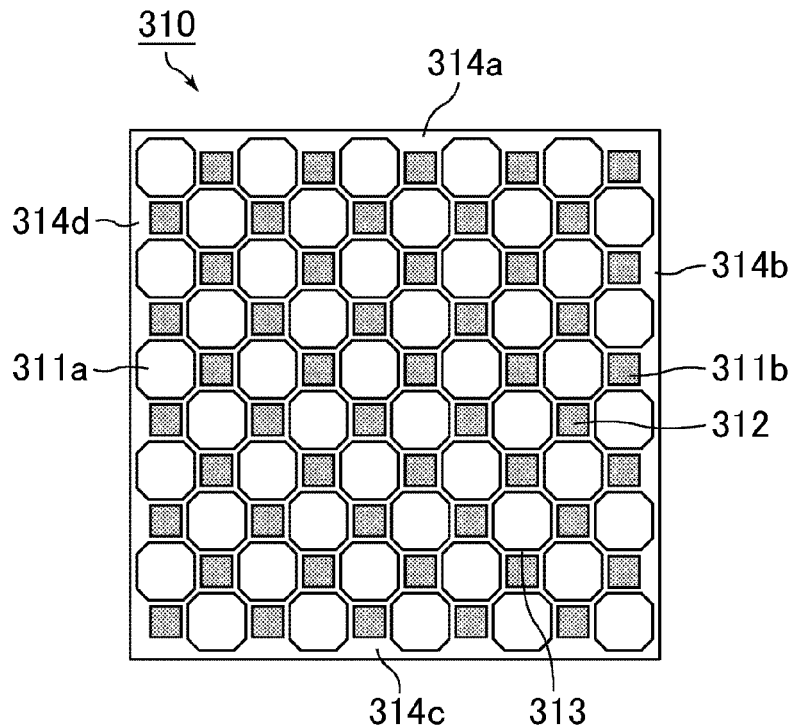
FIG. 8A is a side view schematically illustrating one example of an inner honeycomb fired body in a honeycomb structure of a third embodiment of the present invention.
Figure 8B:
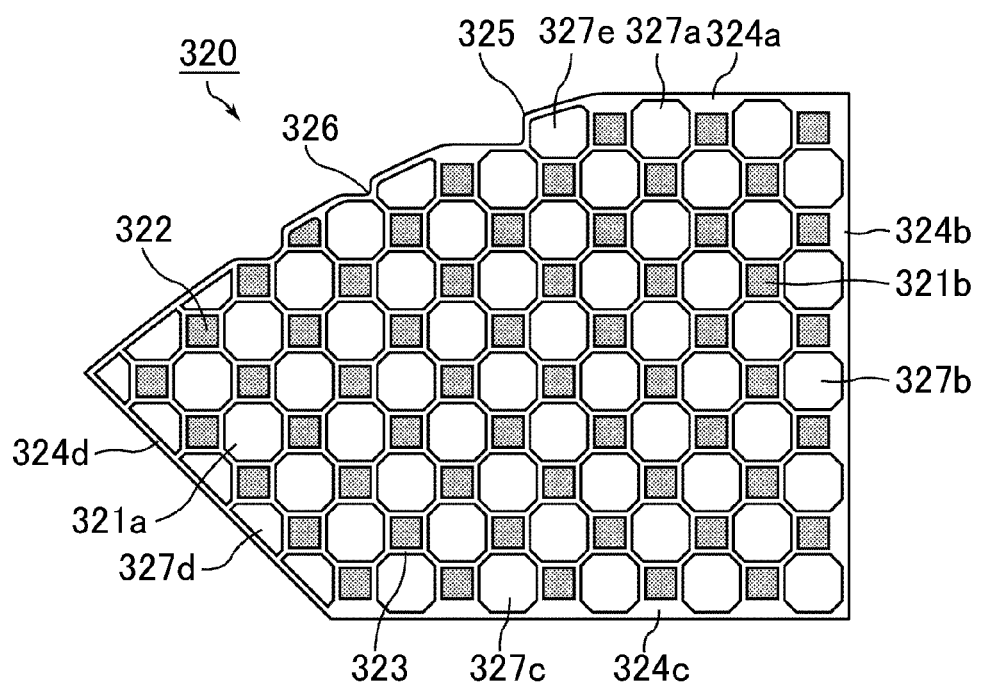
FIG. 8B is a side view schematically illustrating one example of an outer honeycomb fired body in the honeycomb structure of the third embodiment of the present invention.

FIG. 8A is a side view schematically illustrating one example of the inner honeycomb fired body forming the honeycomb structure of the third embodiment of the present invention. FIG. 8B is a side view schematically illustrating one example of the outer honeycomb fired body forming the honeycomb structure of the third embodiment of the present invention.

First, the inner honeycomb fired body is described.

In an inner honeycomb fired body 310 illustrated in FIG. 8A, cells 311a and 311b are placed in parallel with one another with a cell wall 313 therebetween, and peripheral walls 314a to 314d are formed around them. The cells 311a and 311b include a large volume cell 311a and a small volume cell 311b. The large volume cell 311a has a cross sectional area (area of the cross section perpendicular to the longitudinal direction) larger than that of the small volume cell 311b. The large volume cell 311a and the small volume cell 311b are alternately placed.

In FIG. 8A, the large volume cell 311a has an approximate octagonal cross-sectional shape and the small volume cell 311b has an approximate quadrangle cross-sectional shape. Accordingly, the cells 311a and 311b are formed based on the basic formation pattern, namely, they are complete cells.

The large volume cell 311a has an open end portion on a first end face side of the inner honeycomb fired body 310 and an end portion sealed with a plug (not illustrated) on a second end face side. In contrast, the small volume cell 311b has an end portion sealed with a plug 312 on the first end face side of the inner honeycomb fired body 310 and an open end portion on the second end face side.

Accordingly, exhaust gases having flowed into the large volume cell 311a surely pass through the cell wall 313 separating the large volume cell 311a and the small volume cell 311b, and flow out from the small volume cell 311b. Here, the cell wall 313 functions as a filter.

Next, the outer honeycomb fired body is described.

Also in the outer honeycomb fired body illustrated in FIG. 8B, cells 321a, 321b, and 327a to 327e are placed in parallel with one another with a cell wall 323 therebetween, and peripheral walls 324a to 324d are formed around them, in the same manner as in the inner honeycomb fired body.

The peripheral wall 324a forming the periphery of the honeycomb structure (ceramic block), among the peripheral walls 324a to 324d, is a stepped peripheral wall provided with level differences formed by projected portions 325 and recessed portions 326.

In the outer honeycomb fired body 320, the cells 321a, 321b, and 327a to 327e include peripheral cells 327a to 327e contacting with the peripheral walls 324a to 324d and inner cells 321a and 321b positioned under the peripheral cells 327a to 327e.

The inner cells 321a and 321b of the outer honeycomb fired body 320 are complete cells as same as the cells 311a and 311b provided in the inner honeycomb fired body 310. Namely, the inner cells 321a and 321b as the complete cells include a large volume cell 321a and a small volume cell 321b. The large volume cell 321a has a cross sectional area (area of the cross section perpendicular to the longitudinal direction) larger than that of the small volume cell 321b.

The large volume cell 321a has an open end portion on a first end face side of the outer honeycomb fired body 320 and an end portion sealed with a plug (not illustrated) on a second end face side. In contrast, the small volume cell 321b has an end portion sealed with a plug 322 on the first end face side of the inner honeycomb fired body 320 and an open end portion on the second end face side.

Accordingly, exhaust gases having flowed into the large volume cell 321a surely pass through the cell wall 323 separating the large volume cell 321a and the small volume cell 321b, and flow out from the small volume cell 321b. Here, the cell wall 323 functions as a filter.

Among the peripheral cells 327a to 327e of the outer honeycomb fired body 320, the peripheral cell 327a contacting with the peripheral wall 324a, the peripheral cell 327b contacting with the peripheral wall 324b, and the peripheral cell 327c contacting with the peripheral wall 324c have cross-sectional shapes approximately the same as that of the large volume cell 321a that is the inner cell of the outer honeycomb fired body 320. Namely, the peripheral cells 327a, 327b, and 327c of the outer honeycomb fired body 320 are complete cells.

On the other hand, among the peripheral cells 327a to 327e of the outer honeycomb fired body 320, the peripheral cells 327d and 327e have cross-sectional shapes different from the large volume cell 321a that is the inner cell of the outer honeycomb fired body 320 and the complete cell. Namely, the peripheral cells 327d and 327e of the outer honeycomb fired body 320 are incomplete cells having a cross sectional shape different from that of the complete cell.

Accordingly, in the outer honeycomb fired body 320 illustrated in FIG. 8B, the peripheral cells include, in addition to the complete cells, incomplete cells having a cross-sectional shape different from that of the complete cell.

The peripheral cell 327e as the incomplete cell is provided so as to contact with the stepped peripheral wall 324a. The peripheral cell 327d as the incomplete cell is provided so as to contact with the peripheral wall 324d.

In the outer honeycomb fired body 320 illustrated in FIG. 8B, the peripheral cells other than the incomplete cells include large volume cells and small volume cells, in the same manner as in the inner cells.

It is to be noted that the peripheral cells may not include incomplete cells in the present embodiment. In such a case, the present embodiment may be considered as one form of the first embodiment in which the cells having large and small cell cross-sectional areas are employed.

The cross-sectional shapes of the large volume cell and the small volume cell are not particularly limited as long as the cross-sectional area of the large volume cell is larger than that of the small volume cell. Therefore, the cross-sectional shapes of the large volume cell and the small volume cell are not limited to the approximate octagonal shape and the approximate quadrangle shape, respectively, and they may be any cross-sectional shapes. For example, the following shapes may be employed.

Figure 10A:
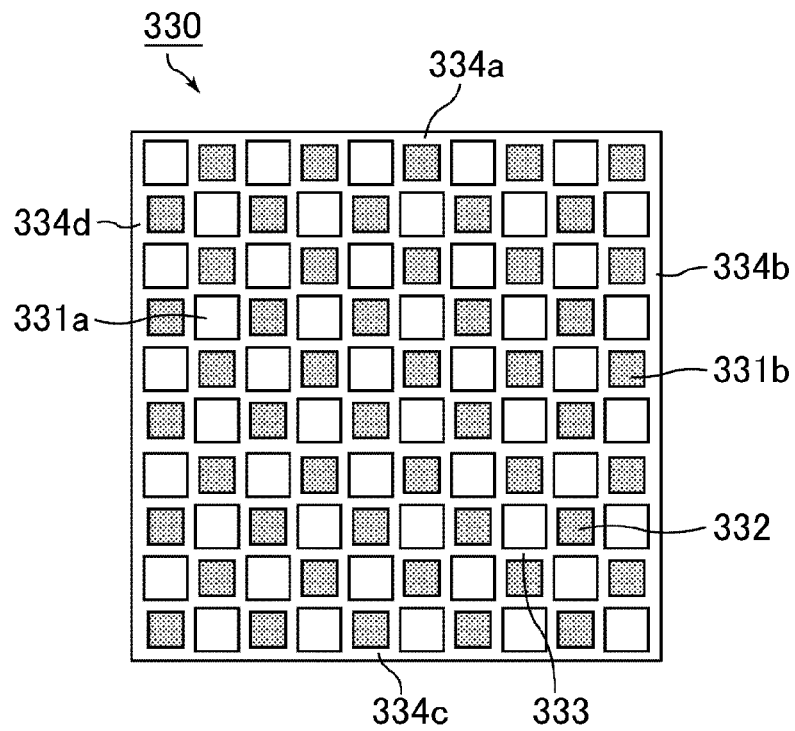
FIG. 10A is a side view schematically illustrating another example of the inner honeycomb fired body in the honeycomb structure of the third embodiment of the present invention.
Figure 10B:
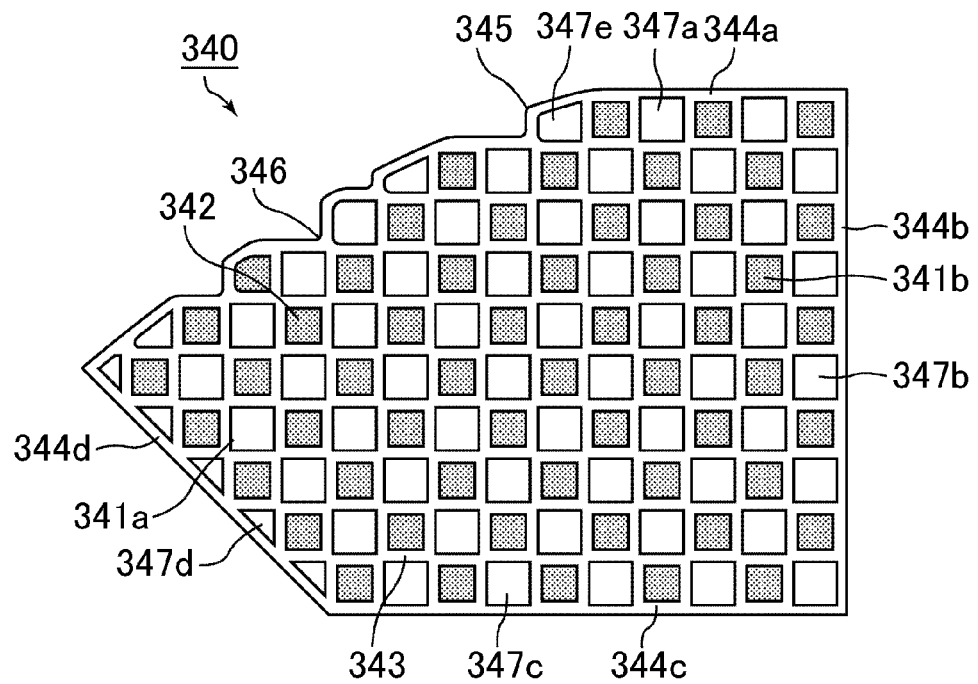
FIG. 10B is a side view schematically illustrating another example of the outer honeycomb fired body in the honeycomb structure of the third embodiment of the present invention.

FIG. 10A is a side view schematically illustrating another example of the inner honeycomb fired body forming the honeycomb structure of the third embodiment of the present invention. FIG. 10B is a side view schematically illustrating another example of the outer honeycomb fired body forming the honeycomb structure of the third embodiment of the present invention.

In an inner honeycomb fired body 330 illustrated in FIG. 10A and an outer honeycomb fired body 340 illustrated in FIG. 10B, the cross sectional shape of the large volume cell is the approximate quadrangle (approximate square) and the cross-sectional shape of the small volume cell is the approximate quadrangle (approximate square).

The cross-sectional shapes of the large volume cell and the small volume cell may have right angle portions. Or alternatively, the cross-sectional shapes thereof may have arcs (shape obtainable by virtually carrying out R-chamfering on a cell) or C-chamfered shapes (shape obtainable by virtually carrying out C-chamfering on a cell) at the parts corresponding to the right angle portions.

Further, also in the present embodiment, at least one of the projected portions and the recessed portions on the stepped peripheral wall are chamfered in the same manner as in the first and second embodiments of the present invention. Accordingly, at least one of the projected portions and the recessed portions are formed by at least one of curve lines and straight lines in a cross section perpendicular to the longitudinal direction of the honeycomb fired body.

In the outer honeycomb fired body 320 illustrated in FIG. 8B, the projected portion 325 and the recessed portion 326 on the stepped peripheral wall 324a are chamfered. Therefore, the projected portion 325 and the recessed portion 326 are formed by curve lines in the cross section perpendicular to the longitudinal direction of the honeycomb fired body. Similarly, in the outer honeycomb fired body 340 illustrated in FIG. 10B, the projected portion 345 and the recessed portion 346 on the stepped peripheral wall 344a are chamfered. Therefore, the projected portion 345 and the recessed portion 346 are formed by curve lines in the cross section perpendicular to the longitudinal direction of the honeycomb fired body.

In the outer honeycomb fired body forming the honeycomb structure of the present embodiment, the corner portion of the peripheral cell may or may not be chamfered.

Further, in the inner honeycomb fired body forming the honeycomb structure of the present embodiment, the corner portion of the peripheral cell may or may not be chamfered.

With regard to the method for manufacturing the honeycomb structure of the present embodiment, the honeycomb structure may be manufactured in approximately the same manner as in the first embodiment of the present invention, except that a die used for extrusion-molding is changed to manufacture a honeycomb molded body in a predetermined shape.

The effects (1) and (2) described in the first embodiment of the present invention and the effects (3) to (6) described in the second embodiment of the present invention may be exerted also in the present embodiment.

Fourth Embodiment

Hereinafter, a fourth embodiment that is one embodiment of the present invention is described.

The present embodiment is different from the first to third embodiments of the present invention in the external shape of the outer honeycomb fired body, whereas the external shape of the inner honeycomb fired body is approximately the same as those in the first to third embodiments of the present invention.

More specifically, the combination of the honeycomb fired bodies in the present embodiment is different from those in the first to third embodiments of the present invention. Namely, inner honeycomb fired bodies used here have the approximate quadrangle (approximate square) cross-sectional shape and a plural kind of outer honeycomb fired bodies used here have various cross-sectional shapes. A ceramic block in a predetermined shape (e.g. approximately circle in the cross section) may be formed by binding the inner honeycomb fired bodies and the plural kind of outer honeycomb fired bodies with an adhesive layer interposed therebetween.

Figure 11:
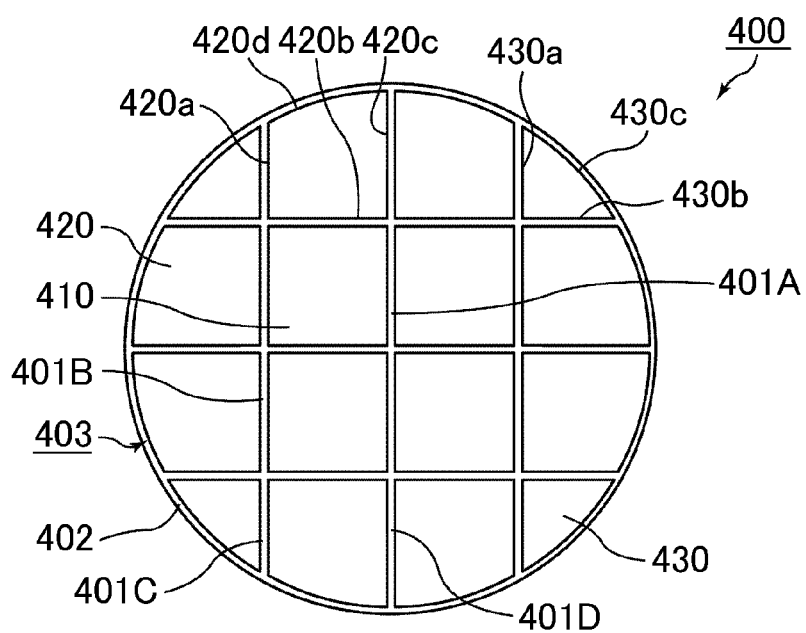
FIG. 11 is a side view schematically illustrating one example of a honeycomb structure of a fourth embodiment of the present invention.

FIG. 11 is a side view schematically illustrating one example of the honeycomb structure of the fourth embodiment of the present invention.

Figure 12A:
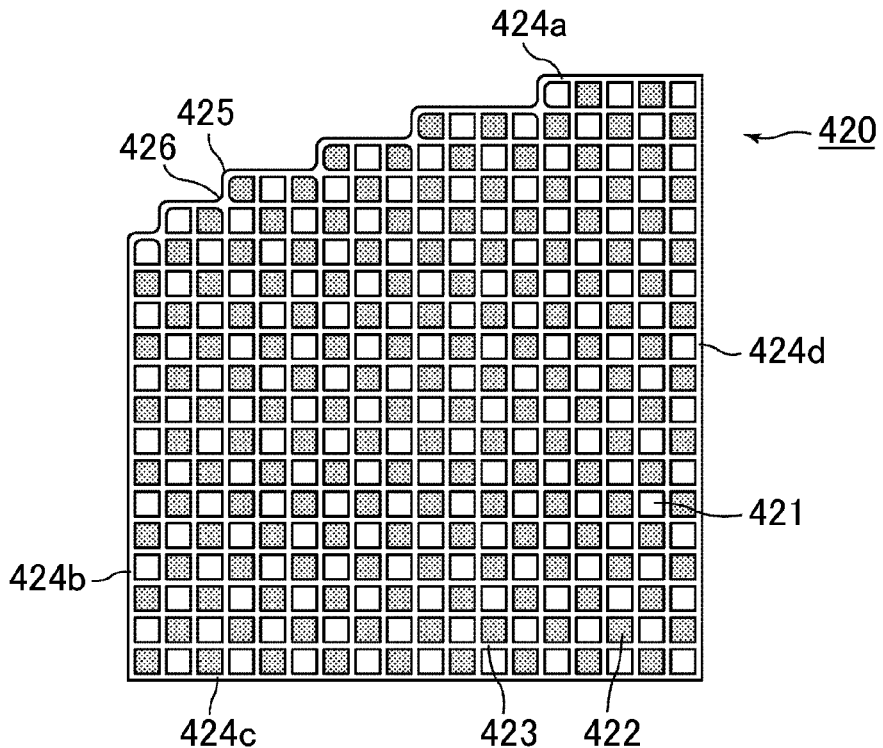
FIGS. 12A and 12B are side views each schematically illustrating one example of an outer honeycomb fired body in the honeycomb structure of the fourth embodiment of the present invention.
Figure 12B:
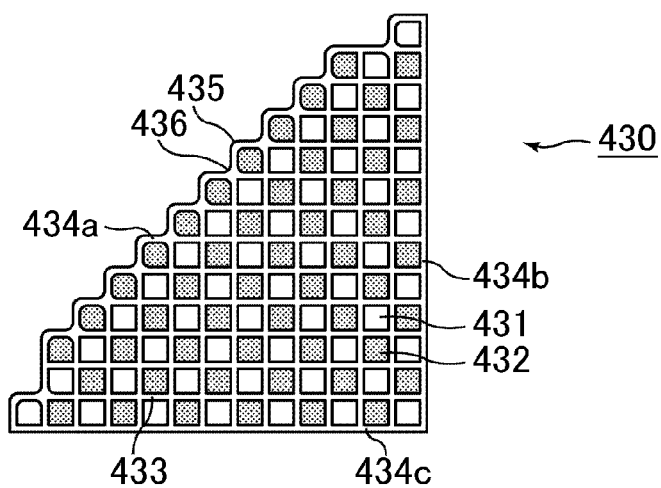

FIGS. 12A and 12B are side views each schematically illustrating one example of the outer honeycomb fired body in the honeycomb structure of the fourth embodiment of the present invention.

In a honeycomb structure 400 illustrated in FIG. 11, eight outer honeycomb fired bodies 420 in the shape including three approximate line segments as illustrated in FIG. 12A, four outer honeycomb fired bodies 430 in the shape including two approximate line segments as illustrated in FIG. 12B, and four inner honeycomb fired bodies 410 positioned under the outer honeycomb fired bodies are bind with adhesive layers 401A to 401D interposed therebetween to form a ceramic block 403. Further, a coat layer 402 is formed on the periphery of the ceramic block 403. The coat layer may be formed according to need.

As illustrated in FIG. 11, the inner honeycomb fired body 410 has an approximate quadrangle (approximate square) cross-sectional shape.

Further, as illustrated in FIG. 11, the cross-sectional shape of the outer honeycomb fired body 420 is a shape surrounded by three line segments 420a, 420b, and 420c and one approximate arc 420d. Two angles formed by two line segments out of the three line segments (the angle formed by the line segments 420b and 420c and the angle formed by the line segments 420a and 420b) are both about 90°.

Moreover, the cross-sectional shape of the outer honeycomb fired body 430 is a shape surrounded by two line segments 430a and 430b and one approximate arc 430c. The angle formed by the two line segments (the angle formed by the line segments 430a and 430b) is about 90°.

The honeycomb fired bodies 410, 420, and 430 are preferably porous bodies including silicon carbide or silicon-containing silicon carbide.

Also in the present embodiment, the peripheral wall forming the periphery of the honeycomb structure (ceramic block), among the peripheral walls of the outer honeycomb fired bodies, is a stepped peripheral wall provided with level differences formed by projected portions and recessed portions in the same manner as in the first to third embodiments of the present invention.

In the outer honeycomb fired body 420 illustrated in FIG. 12A, a peripheral wall 424a forming the periphery of the honeycomb structure (ceramic block), among peripheral walls 424a to 424d formed around the honeycomb fired body 420, is a stepped peripheral wall provided with level differences formed by projected portions 425 and recessed portions 426.

In the outer honeycomb fired body 430 illustrated in FIG. 12B, a peripheral wall 434a forming the periphery of the honeycomb structure (ceramic block), among peripheral walls 434a to 434c formed around the honeycomb fired body 430, is a stepped peripheral wall provided with level differences formed by projected portions 435 and recessed portions 436.

At least one of the projected portions and the recessed portions on the stepped peripheral wall are chamfered, and therefore, at least one of the projected portions and the recessed portions are formed by at least one of curve lines and straight lines in a cross section perpendicular to the longitudinal direction of the honeycomb fired body.

In the outer honeycomb fired body 420 illustrated in FIG. 12A, the projected portions 425 and the recessed portions 426 on the stepped peripheral wall 424a are chamfered so as to be formed by curve lines in a cross section perpendicular to the longitudinal direction of the honeycomb fired body. Similarly, in the outer honeycomb fired body 430 illustrated in FIG. 12B, the projected portions 435 and the recessed portions 436 on the stepped peripheral wall 434a are chamfered so as to be formed by curve lines in a cross section perpendicular to the longitudinal direction of the honeycomb fired body.

All the cells provided in the outer honeycomb fired body may have approximate quadrangle (approximate square) cross-sectional shapes and the cell cross-sectional areas approximately equal to one another in the same manner as in the first and second embodiments of the present invention. Or alternatively, the cells may include large volume cells and small volume cells as in the third embodiment of the present invention.

In the outer honeycomb fired body 420 illustrated in FIG. 12A and in the outer honeycomb fired body 430 illustrated in FIG. 12B, the cross-sectional shapes of the cell contacting with the peripheral wall and of the cell not contacting with the peripheral wall are approximately the same. However, in the present embodiment, the peripheral cells contacting with the peripheral wall may include incomplete cell(s) as in the second embodiment of the present invention.

Further, the corner portion of the peripheral cell of the outer honeycomb fired body may be chamfered as in the second embodiment of the present invention, or may not be chamfered.

The inner honeycomb fired body may have a configuration which corresponds to the configuration of the outer honeycomb fired body and is approximately the same as those described in the first to third embodiments of the present invention.

The corner portion of the peripheral cell in the inner honeycomb fired body may or may not be chamfered.

In a method for manufacturing the honeycomb structure of the present embodiment, the honeycomb structure may be manufactured in approximately the same manner as in the first embodiment of the present invention, except that a die used for extrusion molding is changed to manufacture a honeycomb molded body in a predetermined shape and that the inner honeycomb fired bodies and the outer honeycomb fired bodies are bound at predetermined positions in the binding process thereof.

Also in the present embodiment, the effects (1) and (2) described in the first embodiment of the present invention and the effects (3) to (6) described in the second embodiment of the present invention may be exerted.

Fifth Embodiment

Hereinafter, a fifth embodiment that is one embodiment of the present invention is described.

The present embodiment is different from the first to fourth embodiments of the present invention in the external shape of the outer honeycomb fired body, whereas the external shape of the inner honeycomb fired body is approximately the same as those in the first to fourth embodiments of the present invention.

The present embodiment is approximately the same as the fourth embodiment of the present invention in that inner honeycomb fired bodies used here have the approximate quadrangle (approximate square) cross-sectional shape and a plural kind of outer honeycomb fired bodies used here have various cross-sectional shapes. However, the combination of the honeycomb fired bodies is different from those in the first to fourth embodiments of the present invention.

More specifically, the number of the inner honeycomb fired bodies forming the honeycomb structure is larger than the numbers of the inner honeycomb fired bodies forming the honeycomb structures of the first to fourth embodiments of the present invention.

Figure 13:
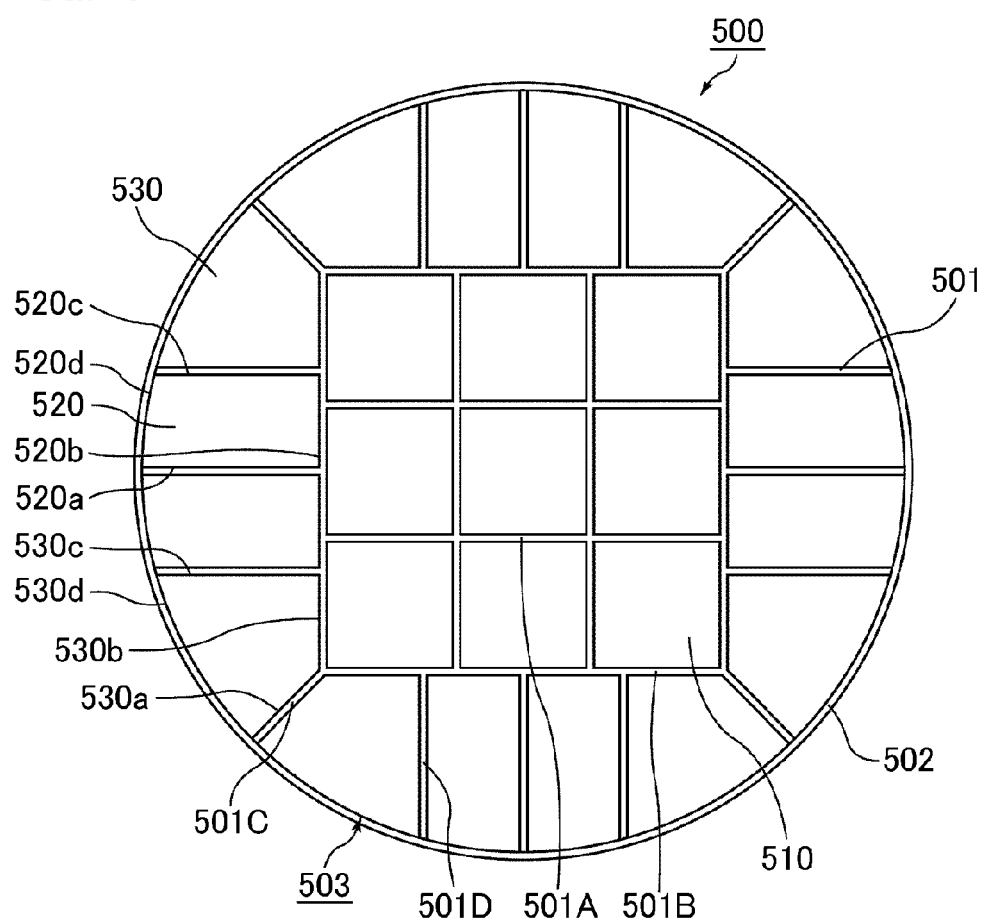
FIG. 13 is a side view schematically illustrating one example of a honeycomb structure of a fifth embodiment of the present invention.

FIG. 13 is a side view schematically illustrating one example of the honeycomb structure of the fifth embodiment of the present invention.

Figure 14A:
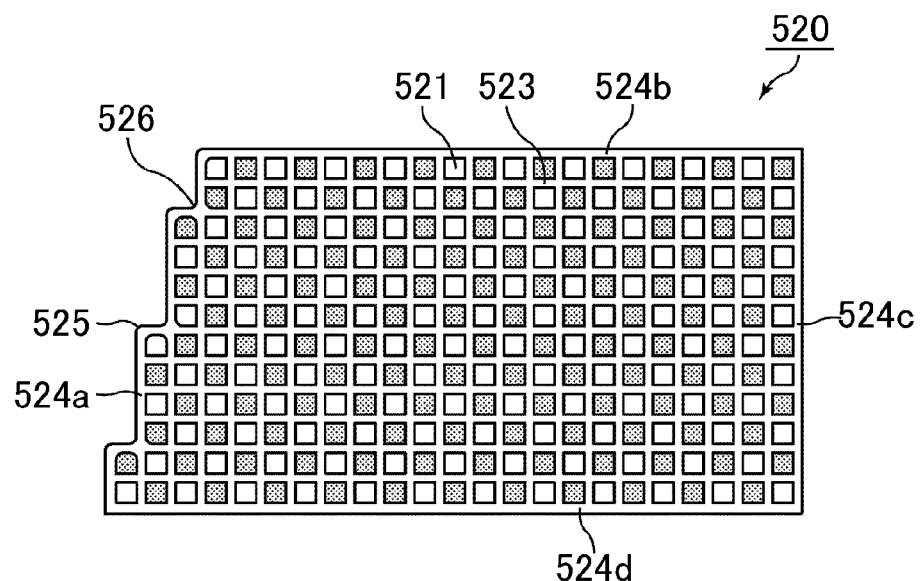
FIGS. 14A and 14B are side views each schematically illustrating one example of an outer honeycomb fired body in the honeycomb structure of the fifth embodiment of the present invention.
Figure 14B:
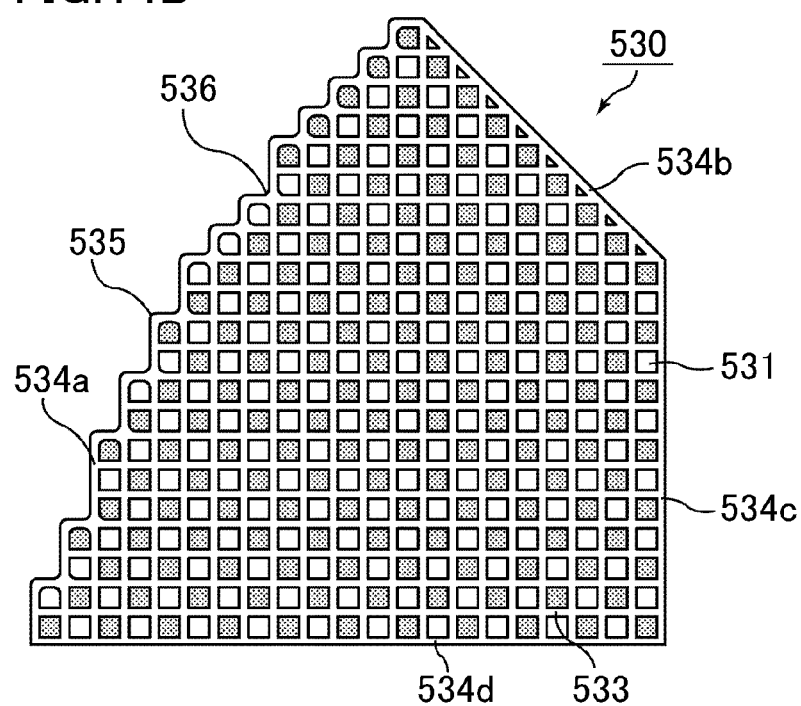

FIGS. 14A and 14B are side views each schematically illustrating one example of the outer honeycomb fired body in the honeycomb structure of the fifth embodiment of the present invention.

In a honeycomb structure 500 illustrated in FIG. 13, eight outer honeycomb fired bodies 520 in the shape including three approximate line segments as illustrated in FIG. 14A, eight outer honeycomb fired bodies 530 in the shape including three approximate line segments as illustrated in FIG. 14B, and nine inner honeycomb fired bodies 510 positioned under the outer honeycomb fired bodies are bind with adhesive layers 501, and 501A to 501D interposed therebetween to form a ceramic block 503. Further, a coat layer 502 is formed on the periphery of the ceramic block 503. The coat layer may be formed according to need.

As illustrated in FIG. 13, the inner honeycomb fired body 510 has an approximate quadrangle (approximate square) cross-sectional shape.

Further, as illustrated in FIG. 13, the cross-sectional shape of the outer honeycomb fired body 520 is a shape surrounded by three line segments 520a, 520b, and 520c and one approximate arc 520d. Two angles formed by two line segments out of the three line segments (the angle formed by the line segments 520a and 520b and the angle formed by the line segments 520b and 520c) are both about 90°.

The outer honeycomb fired body 530 is an approximate sector unit having a cross-sectional shape surrounded by three line segments 530a, 530b, and 530c and one approximate arc 530d. Two angles formed by two line segments out of the three line segments (the angle formed by the line segments 530b and 530c and the angle formed by the line segments 530a and 530b) are about 90° and about 135°.

The honeycomb fired bodies 510, 520, and 530 are preferably porous bodies including silicon carbide or silicon-containing silicon carbide.

Also in the present embodiment, the peripheral wall forming the periphery of the honeycomb structure (ceramic block), among the peripheral walls of the outer honeycomb fired bodies, is a stepped peripheral wall provided with level differences formed by projected portions and recessed portions in a cross section perpendicular to the longitudinal direction of the honeycomb fired body, in the same manner as in the first to fourth embodiments of the present invention.

In the outer honeycomb fired body 520 illustrated in FIG. 14A, a peripheral wall 524a forming the periphery of the honeycomb structure (ceramic block), among peripheral walls 524a to 524d formed around the honeycomb fired body 520, is a stepped peripheral wall provided with level differences formed by projected portions 525 and recessed portions 526.

In the outer honeycomb fired body 530 illustrated in FIG. 14B, a peripheral wall 534a forming the periphery of the honeycomb structure (ceramic block), among peripheral walls 534a to 534d formed around the honeycomb fired body 530, is a stepped peripheral wall provided with level differences formed by projected portions 535 and recessed portions 536.

At least one of the projected portions and the recessed portions on the stepped peripheral wall are chamfered, and therefore, at least one of the projected portions and the recessed portions are formed by at least one of curve lines and straight lines in a cross section perpendicular to the longitudinal direction of the honeycomb fired body.

In the outer honeycomb fired body 520 in FIG. 14A, the projected portions 525 and the recessed portions 526 on the stepped peripheral wall 524a are chamfered so as to be formed by curve lines in the cross section perpendicular to the longitudinal direction of the honeycomb fired body. Similarly, in the outer honeycomb fired body 530 in FIG. 14B, the projected portions 535 and the recessed portions 536 on the stepped peripheral wall 534a are chamfered so as to be formed by curve lines in the cross section perpendicular to the longitudinal direction of the honeycomb fired body.

All the cells provided in the outer honeycomb fired body may have approximate quadrangle (approximate square) cross-sectional shapes and the cell cross-sectional areas approximately equal to one another as in the first and second embodiments of the present invention. Or alternatively, the cells may include large volume cells and small volume cells as in the third embodiment of the present invention.

In the outer honeycomb fired body 520 illustrated in FIG. 14A and in the outer honeycomb fired body 530 illustrated in FIG. 14B, the cross-sectional shapes of the cell contacting with the peripheral wall and of the cell not contacting with the peripheral wall are approximately the same. However, in the present embodiment, the peripheral cells contacting with the peripheral wall may include incomplete cell(s) as in the second embodiment of the present invention.

Further, the corner portion of the peripheral cell of the outer honeycomb fired body may be chamfered as in the second embodiment of the present invention, or may not be chamfered.

The inner honeycomb fired body may have a configuration which corresponds to the configuration of the outer honeycomb fired body and is approximately the same as those described in the first to fourth embodiments of the present invention.

The corner portion of the peripheral cell in the inner honeycomb fired body may or may not be chamfered.

In a method for manufacturing the honeycomb structure of the present embodiment, the honeycomb structure may be manufactured in approximately the same manner as in the first embodiment of the present invention, except that a die used for extrusion molding is changed to manufacture a honeycomb molded body in a predetermined shape and that the inner honeycomb fired bodies and the outer honeycomb fired bodies are bound at predetermined positions in the binding process thereof.

Also in the present embodiment, the effects (1) and (2) described in the first embodiment of the present invention and the effects (3) to (6) described in the second embodiment of the present invention may be exerted.

Other Embodiments

In the first embodiment of the present invention, the corner portions of the peripheral cells are not chamfered in the outer honeycomb fired bodies and in the inner honeycomb fired bodies forming the honeycomb structure. However, also in the outer honeycomb fired body 120 illustrated in FIGS. 6A and 6B, at least one of the corner portions of the peripheral cells may be chamfered. Further, also in the inner honeycomb fired body 110 illustrated in FIGS. 5A and 5B, at least one of the corner portions of the peripheral cells may be chamfered.

In the honeycomb structure according to the embodiment of the present invention, when the ceramic block includes an inner honeycomb fired body and an outer honeycomb fired body, the number of the inner honeycomb fired bodies is not limited to a plurality, and may be one.

Figure 15:
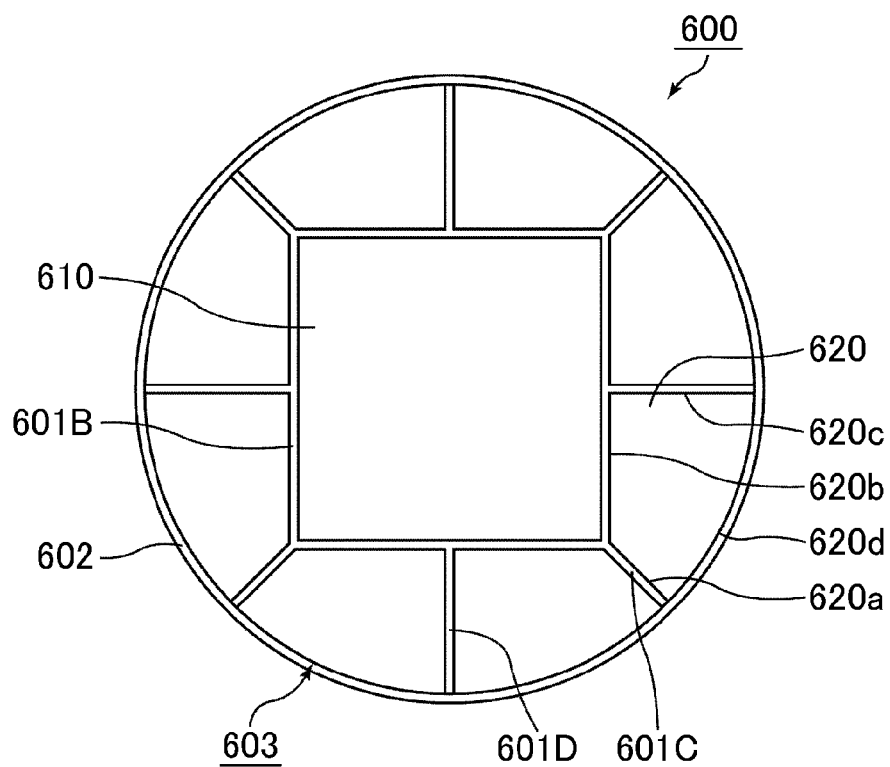
FIG. 15 is a side view schematically illustrating one example of honeycomb structures of other embodiments of the present invention.

More specifically, the honeycomb structure may include one honeycomb fired body positioned at the center of the honeycomb structure and the honeycomb fired bodies positioned at the peripheral portion of the honeycomb structure, as illustrated in FIG. 15.

FIG. 15 is a side view schematically illustrating one example of honeycomb structures of other embodiments of the present invention.

The configuration of a honeycomb structure 600 illustrated in FIG. 15 is approximately the same as that of the honeycomb structure 100 illustrated in FIGS. 3 and 4, except that the number of the inner honeycomb fired bodies is different.

Namely, in the honeycomb structure 600 illustrated in FIG. 15, one inner honeycomb fired body 610 is provided instead of the four inner honeycomb fired bodies 110 bound to one another with an adhesive layer 101A interposed therebetween in the honeycomb structure 100 illustrated in FIG. 4.

The inner honeycomb fired body 610 illustrated in FIG. 15 has approximately the same function as that of the inner honeycomb fired body 110 illustrated in FIG. 4, though the cross-sectional area thereof is larger than that of the inner honeycomb fired body 110. The outer honeycomb fired body 620 illustrated in FIG. 15 is approximately the same as the honeycomb fired body 120 in the honeycomb structure 100 illustrated in FIG. 4.

In the honeycomb structure according to the embodiment of the present invention, when the ceramic block includes an inner honeycomb fired body and an outer honeycomb fired body, the inner honeycomb fired body preferably has the area of the cross section perpendicular to the longitudinal direction of from about 900 mm$^2$ to about 2500 mm$^2$.

When the cross-sectional area of the inner honeycomb fired bodies is in the above range, a crack is less likely to occur in the honeycomb fired body even with the expansion and contraction of the honeycomb fired body subjected to high temperatures during regeneration treatment and the like carried out on the honeycomb structure used as a honeycomb filter.

In the honeycomb structure according to the embodiment of the present invention, the ceramic block may not include an inner honeycomb fired body and an outer honeycomb fired body.

Figure 16:
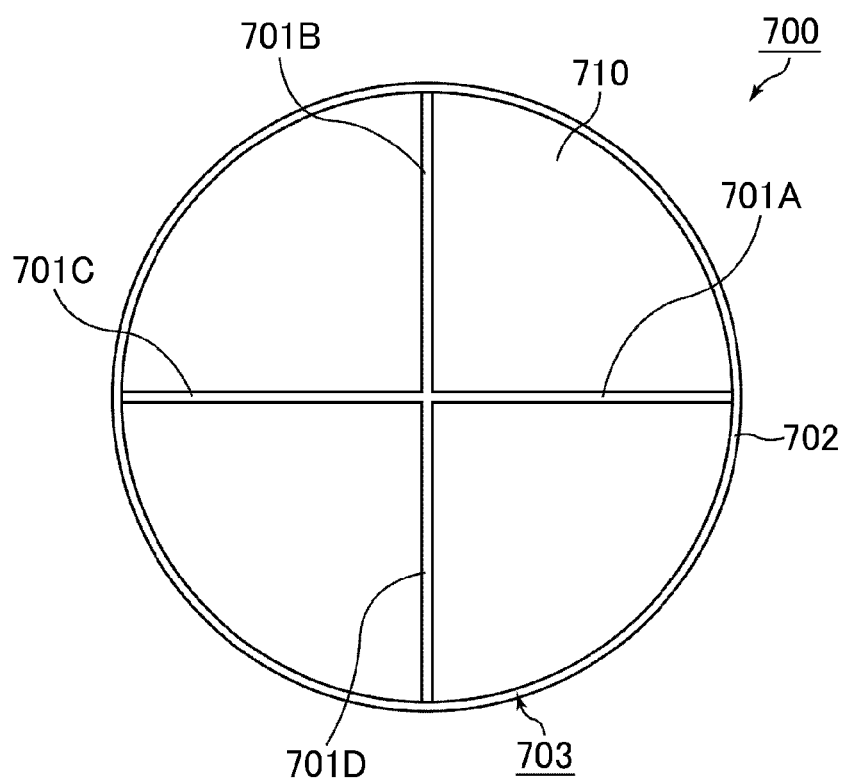
FIG. 16 is a side view schematically illustrating another example of the honeycomb structures of other embodiments of the present invention.

For example, the cross section of the honeycomb structure may be as illustrated in FIG. 16.

FIG. 16 is a side view schematically illustrating another example of the honeycomb structures of other embodiments of the present invention.

In a honeycomb structure 700 illustrated in FIG. 16, four honeycomb fired bodies 710 are bound with adhesive layers 701A to 701D interposed therebetween to form a ceramic block 703. Further, a coat layer 702 is formed on the periphery of the ceramic block 703.

In the honeycomb structure 700 illustrated in FIG. 16, the honeycomb fired body 710 has a cake shape and the ceramic block 703 is separated into four honeycomb fired bodies 710. However, the number of the honeycomb fired bodies separating the ceramic block is not particularly limited in the honeycomb structure according to the embodiment of the present invention.

In the honeycomb structure according to the embodiment of the present invention, the ceramic block may include honeycomb fired bodies having cake shapes. One or more kinds of honeycomb fired bodies having cake shapes may be included and the number of kinds is not particularly limited.

Here, the cake shape refers to an approximate pillar shape obtainable by cutting a column along the central axis into plural pieces. The plural pieces of the honeycomb fired bodies in the cake shape are combined to form an approximate column.

Further, in the honeycomb structure according to the embodiment of the present invention, the ceramic block may include only one honeycomb fired body. When the ceramic block is formed by one honeycomb fired body, the honeycomb fired body is preferably made of cordierite or aluminum titanate. It is presumable that the similar effects may be exerted both in the ceramic block formed by one honeycomb fired body and in the ceramic block formed by a plurality of honeycomb fired bodies.

In the embodiment of the present invention, the ceramic block may be formed by one honeycomb fired body or a combination of honeycomb fired bodies having different shapes as long as the peripheral wall of the honeycomb fired body forming the periphery of the ceramic block is a stepped peripheral wall provided with a level difference formed by a projected portion and a recessed portion in a cross section perpendicular to the longitudinal direction of the honeycomb fired body.

In the honeycomb structure according to the embodiment of the present invention, when the complete cells include large volume cells and small volume cells, the configuration of the large volume cells and small volume cells are not limited to the configuration described in the preceding embodiments.

FIGS. 17A and 17B are side views each schematically illustrating one example of an end face of the inner honeycomb fired body in the honeycomb structure according to the embodiment of the embodiment of the present invention.

Each of these drawings are a side view of one end face of the inner honeycomb fired body, namely, the end face on the side where the small volume cells are sealed.

Other embodiments of the cross-sectional shapes of the large volume cell and the small volume cell are described with reference to these drawings.

In a honeycomb fired body 810 illustrated in FIG. 17A, the shape of a large volume cell 811a in a cross section perpendicular to the longitudinal direction is an approximate quadrangle in which parts corresponding to corner portions are arcs, and the shape of a small volume cell 811b in a cross section perpendicular to the longitudinal direction is an approximate quadrangle.

In an inner honeycomb fired body 820 illustrated in FIG. 17B, large volume cells 821a and small volume cells 821b are cells in which each side is formed by a curve line in a cross sections perpendicular to the longitudinal direction.

Namely, the cross-sectional shape of cell walls 823 indicated by solid lines are formed by curve lines in FIG. 17B.

The large volume cell 821a has a cross sectional shape in which cell walls 823 project from the center toward the outside of the cell cross section. In contrast, the small volume cell 821b has a cross sectional shape in which cell walls 823 project from the outside toward the center of the cell cross section.

The cell wall 823 has a "wave" shape undulating horizontally and vertically in a cross section of the inner honeycomb fired body. The tops of the waves of the adjacent cell walls 823 (maximum amplitude of sinusoid) are most proximate to each other so that the large volume cell 821a having a cross-sectional shape expanding outwardly and the small volume cell 821b recessing inwardly may be formed. The amplitude of the wave may or may not be constant. In particular, constant wave is preferable.

Also in the outer honeycomb fired body, the large volume cells and the small volume cells may have cross sections as illustrated in FIG. 17A or 17B. In the case that the peripheral cells of the outer honeycomb fired body includes incomplete cells, the inner cells and the peripheral cells other than the incomplete cells may have cross sections as illustrated in FIG. 17A or 17B.

In the honeycomb structure according to the embodiment of the present invention, the stepped peripheral wall may have a thickness as approximately the same as that of the cell wall or a thickness greater than that of the cell wall.

When the stepped peripheral wall is thicker than the cell wall, the stepped peripheral wall is preferably from about 1.3 times to about 3.0 times thicker than the cell wall.

The shape of the honeycomb structure according to the embodiment of the present invention is not limited to an approximate round pillar shape, and may be any pillar shape such as an approximate cylindroid shape and an approximate rectangular pillar shape.

In the honeycomb structure according to the embodiment of the present invention, end portions of the cells may not be sealed. Such a honeycomb structure may be used as a catalyst carrier.

In the honeycomb structure according to the embodiment of the present invention used as a filter, the porosity of the honeycomb fired body included in the honeycomb structure is not particularly limited and is preferably from about 35% to about 60%.

The porosity of the honeycomb fired body of about 35% or more is less likely to cause early clogging of the filter. In contrast, the porosity of the honeycomb fired body of about 60% or less is less likely to lower the strength of the honeycomb fired body, so that breakage of the filter is less likely to occur.

In the honeycomb structure according to the embodiment of the present invention used as a filter, the honeycomb fired body included in the honeycomb structure preferably has the average pore size of from about 5 µm to about 30 µm.

The average pore size of the honeycomb fired body of about 5 µm or more is less likely to cause easy clogging of particulates in the filter. In contrast, the average pore size of the honeycomb fired body of about 30 µm or less is less likely to allow particulates to pass through the pores. In such a case, the honeycomb fired body is more likely to capture particulates surely so as to function as a filter.

The porosity and the pore size can be measured by the conventionally known methods such as a mercury penetration method.

The cell density in a cross section perpendicular to the longitudinal direction of the honeycomb fired body according to the embodiment of the present invention is not particularly limited, and the lower limit thereof is preferably about 31.0 pcs/cm$^2$ (about 200 pcs/inch$^2$) and the upper limit thereof is preferably about 93.0 pcs/cm$^2$ (about 600 pcs/inch$^2$). The lower limit of the cell density is more preferably about 38.8 pcs/cm$^2$ (about 250 pcs/inch$^2$) and the upper limit thereof is more preferably about 77.5 pcs/cm$^2$ (about 500 pcs/inch$^2$).

The thickness of the cell wall in the honeycomb fired body is not particularly limited, and is preferably from about 0.1 mm to about 0.4 mm.

In the honeycomb structure according to the embodiment of the present invention, the shape of each cell in the honeycomb fired body in a cross section perpendicular to the longitudinal direction of the honeycomb fired body is not particularly limited, and may be any shape such as an approximate circular shape, an approximate elliptical shape, an approximate quadrangle shape, an approximate pentagonal shape, an approximate hexagonal shape, an approximate trapezoidal shape, and an approximate octagonal shape. Or alternatively, various shapes of cells may be present in combination.

The main component of the material for the honeycomb fired body in the honeycomb structure according to the embodiment of the present invention is not limited to silicon carbide or silicon-containing silicon carbide, and may be other ceramic materials. The other ceramic materials refer to ceramic powder including: ceramic nitrides such as aluminum nitride, silicon nitride, boron nitride, and titanium nitride; ceramic carbides such as zirconium carbide, titanium carbide, tantalum carbide, and tungsten carbide; and ceramic oxides such as cordierite and aluminium titanate.

Among these, in the case that the honeycomb structure includes a plurality of honeycomb fired bodies, non-oxide ceramics are preferable and silicon carbide or silicon-containing silicon carbide is particularly preferable because of its excellent heat resistance, mechanical strength, thermal conductivity, and the like.

The particle size of the ceramic powder is not particularly limited and the ceramic powder that tends not to cause the case where the size of the honeycomb fired body manufactured by the following firing treatment becomes smaller than that of the degreased honeycomb molded body is desirable.

The organic binder in the wet mixture used for manufacturing the honeycomb fired body included in the honeycomb structure according to the embodiment of the present invention is not particularly limited, and examples thereof include methylcellulose, carboxymethylcellulose, hydroxy ethylcellulose, polyethylene glycol, and the like. Methylcellulose is preferable among these. A blending amount of the organic binder is preferably from about 1 part by weight to about 10 parts by weight per 100 parts by weight of the ceramic powder.

The plasticizer in the wet mixture is not particularly limited, and examples thereof include glycerin and the like.

The lubricant in the wet mixture is not particularly limited, and examples thereof include polyoxyalkylene-based compounds such as polyoxyethylene alkyl ether and polyoxypropylene alkyl ether. Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture, and examples of the dispersant solution include water, an organic solvent such as benzene, alcohol such as methanol, and the like.

Furthermore, a molding aid may be added to the wet mixture.

The molding aid is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, and graphite may be added to the wet mixture, if necessary.

The balloon is not particularly limited, and examples thereof include alumina balloon, glass micro balloon, shirasu balloon, fly ash balloon (FA balloon), mullite balloon, and the like. Alumina balloon is desirable among these.

Examples of the inorganic binder in the adhesive paste and the coating material paste include silica sol, alumina sol, and the like. Each of these materials may be used alone, or two or more of these may be used in combination. Silica sol is preferable among the inorganic binders.

Examples of the inorganic particles in the adhesive paste and the coating material paste include carbide particles, nitride particles, and the like. Specific examples thereof include inorganic particles made from silicon carbide, silicon nitride, boron nitride, and the like. Each of these may be used alone, or two or more of these may be used in combination. Among the inorganic particles, silicon carbide particles are preferable due to its superior thermal conductivity.

Examples of the inorganic fibers and/or whisker in the adhesive paste and the coating material paste include inorganic fibers and/or whisker made from silica-alumina, mullite, alumina, silica, and the like. Each of these may be used alone or two or more kinds of these may be used in combination. Alumina fibers are desirable among the inorganic fibers. The inorganic fiber may be biosoluble fiber.

A catalyst for converting exhaust gases may be supported on the honeycomb structure according to the embodiment of the present invention. Preferable examples of the catalyst include noble metals such as platinum, palladium, and rhodium. Other examples of the catalyst include alkali metals such as potassium and sodium, and alkaline earth metals such as barium. Each of these catalysts may be used alone, or two or more of these may be used in combination.

In stead of a method for applying an adhesive paste to the side faces of each of the honeycomb fired bodies, the binding process in the method for manufacturing a honeycomb structure according to the embodiment of the present invention may be carried out, for example, by using a method in which each of the honeycomb fired bodies is temporarily fixed in a molding frame having almost the same shape as the shape of the ceramic block (or an aggregated body of the honeycomb fired bodies) to be manufactured and an adhesive paste is injected into the each gap between the honeycomb fired bodies.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb structure comprising:
    a ceramic block including at least one honeycomb fired body that has cell walls extending along a longitudinal direction of the at least one honeycomb fired body to define cells and that has a peripheral wall formed around the at least one honeycomb fired body,
    wherein the peripheral wall of the at least one honeycomb fired body, which forms a periphery of the ceramic block, is a stepped peripheral wall provided with a level difference including a projected portion and a recessed portion in a cross section perpendicular to the longitudinal direction of the at least one honeycomb fired body,
    wherein the projected portion and the recessed portion are formed by at least one of a curved line and a straight line in the cross section perpendicular to the longitudinal direction of the at least one honeycomb fired body by being subjected to chamfering,
    wherein the peripheral wall includes a first portion extending from one end of the peripheral wall to the projected portion that is chamfered, the first portion being formed entirely of a planar outer surface that extends from the one end to the projected portion that is chamfered, and
    wherein the planar outer surface of the first portion extends along cell walls of a plurality of the cells of the at least one honeycomb fired body.

2. The honeycomb structure according to claim 1, wherein
    the at least one honeycomb fired body has a plurality of honeycomb fired bodies, and
    the ceramic block includes the plurality of honeycomb fired bodies bound to one another with an adhesive layer interposed therebetween.

3. The honeycomb structure according to claim 2, wherein
    the ceramic block includes a combination of the plurality of honeycomb fired bodies having various shapes, and
    the plurality of honeycomb fired bodies include
        one or more outer honeycomb fired bodies positioned at a peripheral portion of the ceramic block and
        one or more inner honeycomb fired bodies positioned to be surrounded by the outer honeycomb fired body.

4. The honeycomb structure according to claim 3, wherein
    the ceramic block includes eight pieces of the outer honeycomb fired bodies and four pieces of the inner honeycomb fired bodies.

5. The honeycomb structure according to claim 3, wherein
    a cross-sectional shape of each of the inner honeycomb fired bodies is approximately quadrangle,
    a cross-sectional shape of each of the outer honeycomb fired bodies is a shape surrounded by three line segments and one approximate arc, and
    two angles formed by two line segments out of the three line segments are about 90° and about 135°, respectively.

6. The honeycomb structure according to claim 3, wherein
the ceramic block includes twelve pieces of the outer honeycomb fired bodies and four pieces of the inner honeycomb fired bodies.

7. The honeycomb structure according to claim 3, wherein
the ceramic block includes sixteen pieces of the outer honeycomb fired bodies and nine pieces of the inner honeycomb fired bodies.

8. The honeycomb structure according to claim 3, wherein
a number of the inner honeycomb fired bodies is one.

9. The honeycomb structure according to claim 3, wherein
each of the inner honeycomb fired bodies has an area of the cross section perpendicular to the longitudinal direction of from about 900 mm² to about 2500 mm².

10. The honeycomb structure according to claim 2, wherein
each of the plurality of honeycomb fired bodies comprises silicon carbide or silicon-containing silicon carbide.

11. The honeycomb structure according to claim 2, wherein
each of the plurality of honeycomb fired bodies has a cake shape being an approximate pillar shape obtainable by cutting a column along a central axis into plural pieces.

12. The honeycomb structure according to claim 11, wherein
the ceramic block comprises four pieces of the honeycomb fired bodies of the same type which are bound to one another.

13. The honeycomb structure according to claim 1, wherein
at least one of the projected portion and the recessed portion is formed only by a curved line in the cross section perpendicular to the longitudinal direction of the at least one honeycomb fired body.

14. The honeycomb structure according to claim 13, wherein
R-chamfering is carried out on all of the projected portion and the recessed portion of the peripheral wall, which form the level difference.

15. The honeycomb structure according to claim 1, wherein
the cells include
    peripheral cells contacting with the peripheral wall of the at least one honeycomb fired body and
    inner cells positioned to be surrounded by the peripheral cells,
inner walls of the peripheral cells have first corner portions, and
at least one of the first corner portions is subjected to chamfering.

16. The honeycomb structure according to claim 15, wherein
the chamfering carried out on at least one of the first corner portions is R-chamfering, and
the R-chamfering is carried out in a manner such that a radius of curvature is from about 0.3 mm to about 2.5 mm.

17. The honeycomb structure according to claim 1, wherein
the cells include
    peripheral cells contacting with the peripheral wall of the at least one honeycomb fired body and
    inner cells positioned to be surrounded by the peripheral cells,
the inner cells are complete cells formed in accordance with a basic formation pattern, and
peripheral cells contacting with the stepped peripheral wall, among the peripheral cells, include
    an incomplete cell having a shape different from each of the complete cells in the cross section perpendicular to the longitudinal direction.

18. The honeycomb structure according to claim 17, wherein
each of the inner cells and the peripheral cells other than the incomplete cell has approximate quadrangle shape in the cross section perpendicular to the longitudinal direction.

19. The honeycomb structure according to claim 17, wherein
the inner cells and the peripheral cells other than the incomplete cell include large volume cells and small volume cells, and
each of the large volume cells is larger than each of the small volume cells in the cross section perpendicular to the longitudinal direction.

20. The honeycomb structure according to claim 19, wherein
each of the large volume cells has an approximate quadrangle shape in the cross section perpendicular to the longitudinal direction, and
each of the small volume cells has an approximate quadrangle shape in the cross section perpendicular to the longitudinal direction.

21. The honeycomb structure according to claim 19, wherein
each of the large volume cells has an approximate octagonal shape in the cross section perpendicular to the longitudinal direction, and
each of the small volume cells has an approximate quadrangle shape in the cross section perpendicular to the longitudinal direction.

22. The honeycomb structure according to claim 19,
wherein each side of the large volume cells and of the small volume cells is formed by a curved line in the cross section perpendicular to the longitudinal direction.

23. The honeycomb structure according to claim 17, wherein
the incomplete cell has the cross section perpendicular to the longitudinal direction in which a circle having a diameter of about 0.9 mm can be drawn.

24. The honeycomb structure according to claim 17, wherein
the incomplete cell has the cross section perpendicular to the longitudinal direction in which a circle having a diameter of about 0.95 mm can be drawn.

25. The honeycomb structure according to claim 1, wherein
the stepped peripheral wall of the at least one honeycomb fired body is thicker than the cell walls of the at least one honeycomb fired body.

26. The honeycomb structure according to claim 25, wherein
the stepped peripheral wall of the at least one honeycomb fired body is from about 1.3 times to about 3 times thicker than the cell walls of the at least one honeycomb fired body.

27. The honeycomb structure according to claim 1, wherein
a thickness of the peripheral walls other than parts corresponding to positions of the projected portion and the recessed portion, among the stepped peripheral walls of the at least one honeycomb fired body, is approximately uniform.

28. The honeycomb structure according to claim 1, wherein
the at least one honeycomb fired body includes a first end portion and a second end portion opposite to the first end portion in the longitudinal direction,
the cells are alternately sealed at the first end portion and the second end portion.

29. The honeycomb structure according to claim 1, wherein
a coat layer is formed on a peripheral face of the ceramic block.

30. The honeycomb structure according to claim 29, wherein
the coat layer is formed in a manner such that the recessed portion of the level difference is filled.

31. The honeycomb structure according to claim 1, wherein
chamfering is carried out on all of the projected portion and the recessed portion of the peripheral wall, which form the level difference.

32. The honeycomb structure according to claim 1, wherein
the ceramic block includes only one honeycomb fired body as the at least one honeycomb fired body.

33. The honeycomb structure according to claim 32, wherein
the one honeycomb fired body is made of cordierite or aluminum titanate.

34. The honeycomb structure according to claim 1, wherein
a catalyst is supported on the honeycomb structure.

35. The honeycomb structure according to claim 1, wherein
the peripheral wall of the at least one honeycomb fired body continuously decreases or continuously increases in a stepwise manner from the one end to an opposite end thereof.

36. The honeycomb structure according to claim 1, wherein
the first portion forms an upper surface of a first step of the stepped peripheral wall.

* * * * *